United States Patent
Hunter et al.

(10) Patent No.: US 11,997,982 B2
(45) Date of Patent: Jun. 4, 2024

(54) SPRAYING SYSTEM, METHODS OF MAKING AND USING THE SAME, AND COMPUTER-READABLE MEDIUM FOR CONTROLLING THE SAME

(71) Applicants: Michael A. Hunter, Wheatfield, IN (US); Ronald Cameron, Francesville, IN (US); Lawrence Moon, Hanford, CA (US)

(72) Inventors: Michael A. Hunter, Wheatfield, IN (US); Ronald Cameron, Francesville, IN (US); Lawrence Moon, Hanford, CA (US)

(73) Assignee: BECO Dairy Automation Inc., Hanford, CA (US)

( * ) Notice: Subject to any disclaimer, the term of this patent is extended or adjusted under 35 U.S.C. 154(b) by 117 days.

(21) Appl. No.: 17/555,413

(22) Filed: Dec. 18, 2021

(65) Prior Publication Data

US 2023/0189751 A1      Jun. 22, 2023

(51) Int. Cl.
| | | |
|---|---|---|
| *A01J 7/04* | (2006.01) | |
| *A01K 1/12* | (2006.01) | |
| *B05B 1/30* | (2006.01) | |
| *B05B 13/04* | (2006.01) | |

(52) U.S. Cl.
CPC .................. *A01J 7/04* (2013.01); *A01K 1/126* (2013.01); *B05B 1/30* (2013.01); *B05B 13/0405* (2013.01)

(58) Field of Classification Search
CPC .... A01J 7/04; B05B 13/0405; B05B 13/0636; B08B 3/024
See application file for complete search history.

(56) References Cited

U.S. PATENT DOCUMENTS

| | | | | |
|---|---|---|---|---|
| 6,105,536 A | * | 8/2000 | DeWaard | A01J 7/04 |
| | | | | 119/14.18 |
| 6,443,094 B1 | * | 9/2002 | DeWaard | A01J 7/04 |
| | | | | 119/14.18 |
| 8,707,905 B2 | * | 4/2014 | Hofman | G06T 7/73 |
| | | | | 119/670 |
| 10,104,863 B1 | * | 10/2018 | Henry | B25J 15/04 |

(Continued)

FOREIGN PATENT DOCUMENTS

| | | | | |
|---|---|---|---|---|
| CN | 108787259 A | * | 11/2018 | |
| WO | WO-2013130000 A1 | * | 9/2013 | A01J 7/04 |

*Primary Examiner* — Joshua D Huson
*Assistant Examiner* — Alanna K Peterson
(74) *Attorney, Agent, or Firm* — Andrew D. Fortney; Central California IP Group, P.C.

(57) ABSTRACT

A sprayer system including a wand, a rotary arm, a motor, a housing, a support, and a controller or control panel. The wand has a nozzle at one end. The rotary arm rotates around a first axle, and is connected at a distal end through a bearing to an opposite end of the wand. The housing covers or encloses a part of the wand, the rotary arm, and a rotatable ring through which the wand passes. The motor drives rotation of the rotary arm. The support mechanically supports the housing. The controller/control panel controls rotation of the rotary arm. The wand, the rotary arm and the ring are configured so that rotation of the rotary arm causes the nozzle to move in a circular, elliptical and/or oval pattern. Methods of making and using the sprayer system and software for controlling the system are also disclosed.

20 Claims, 12 Drawing Sheets

(56) References Cited

U.S. PATENT DOCUMENTS

| | | |
|---|---|---|
| 10,757,907 B1 | 9/2020 | Devereaux |
| 11,051,484 B2 * | 7/2021 | Arnott .................... B05B 15/70 |
| 2015/0366157 A1 * | 12/2015 | Holmstrom ............ B25J 9/1664 |
| | | 119/670 |

* cited by examiner

SPRAYING SYSTEM, METHODS OF MAKING AND USING THE SAME, AND COMPUTER-READABLE MEDIUM FOR CONTROLLING THE SAME

FIELD OF THE INVENTION

The present invention generally relates to the field of spraying equipment and methods. More specifically, embodiments of the present invention pertain to a sprayer and spraying system suitable for use with rotary support structures, and in particular, to teat disinfectant sprayer systems, as well as methods for making and using the same and computer-readable media (e.g., software) for controlling the same.

DISCUSSION OF THE BACKGROUND

Prior to (and sometimes after) milking, the teats of a dairy cow are often sanitized (e.g., using an iodine solution). In the past, such sanitizing was performed manually by spraying disinfectant onto the teats, or by dipping the teats into the disinfectant. Automated processes are now known.

For example, FIGS. 1-3 are diagrams showing a conventional system 10 for applying a disinfectant to teats of a dairy cow 12 according to U.S. Pat. No. 10,757,907. The disinfectant can be applied as part of a milking operation in which the teats are sanitized prior to milking (and/or subsequent to milking). The dairy cows are sequentially placed on a rotary dairy parlor 14 and rotated while the teats are disinfected and the cows are milked. The system includes a spray station 18 disposed adjacent to the rotary dairy parlor 14 or rotating platform thereof. The system 10 and the station 18 can comprise a frame 22 or body that can carry and/or contain various components of the system. The frame 22 can form a skeleton or exoskeleton and be formed of metal.

A vertical axle 26 can be disposed in the spray station 18 and pivotal to follow the dairy cow 12 as the dairy cow 12 rotates through the rotary dairy parlor 14. The axle 26 can pivot during use and the rotary dairy parlor can rotate in opposite directions. A plate can be affixed to an upper portion of the frame, and a top of the axle 26 can be rotatably secured to the plate, and thus the upper portion of the frame 22. The top of the axle 26 can have an annular shoulder or flange abutting a collar carried by the plate (not shown). The collar can form or carry a rotational bearing in which the axle 26 pivots. A lobe 30 can be rigidly affixed to the top of the axle 26, and can turn with the axle, or can be used as a lever to turn the axle. The axle can define a vertical axis 32.

A wand 34 is carried by the axle 26, and is pivotal with the axle to follow the dairy cow as the dairy cow rotates through the spray station 18. The wand 34 can be suspended or pendent from the axle 26 and extend from a shroud 38 that is affixed to a bottom end of the axle 26. The shroud 38 can form a housing for the wand 34 and a first linear motor 42. The first linear motor 42 can be suspended or pendent from the axle 26. The first linear motor 42 can be coupled to the wand 34 to extend the wand as the wand pivots. The wand 34 can be carried by a slide (not shown), and the first linear motor 42 can be coupled to the slide to displace the slide, and thus the wand 34. The first linear motor 42 can travel along the slide to displace the slide and the wand. The slide can comprise a sled or trolley movable on one or more rails or rods. The wand 34 can be mounted on the sled or trolley. As the linear motor 42 operates, the wand 34 is extended from and retracted into the shroud 38. The use of a linear motor provides accurate and robust positioning. In addition, the use of a linear motor can provide safety to workers and the cow. The linear motor 42 can be configured to move with limited force such that motion of the wand 34 is stopped by contact with workers or the cow. In addition, the system 18 can be configured to sense contact by the wand 34 with a worker or the cow by an amp measurement of the linear motor 42.

A sprayer 46 or nozzle is carried by the wand 34, and is positioned under an udder 50 (and teats thereof) of the dairy cow 12 to spray the udder and teats thereof with disinfectant from the sprayer. The station 18 and/or the frame 22 can carry a tank 54 containing the disinfectant. The tube can run from the tank 54, through or along the axle 26, through or along the wand 34, to the sprayer 46 or nozzle.

A second linear motor 58 can be carried by the frame 22 and coupled to the axle 26. The second linear motor 58 can pivot the lobe 30, and thus the axle 26, to pivot the shroud 38, and thus the wand 34. Thus, the second linear motor 58 can pivot the wand 34 so that the head or sprayer 46 thereof can follow the teats of the cow as the cow rotates on the rotary dairy parlor. In addition, the first linear motor 42 can extend (and later retract) the wand 34 so that the head or sprayer 46 thereof can extend between the cow's rear legs and position the head or sprayer 46 under the udder and teats. The sprayer 46 or nozzle (or head of the wand 34) can track the movement of the udder and teats as the cow rotates on the rotary dairy parlor 14. Thus, the sprayer 46 or nozzle (or head of the wand) can travel in a broad arc or arcuate path (in a horizontal plane) of travel matching the rotary dairy parlor 14. The pivoting motion axle 46 accomplished by the second linear motor 58 and the extending retracting movement of the wand 34 accomplished by the first linear motor 42 can be combined to achieve the arcuate path of travel. Thus, the two linear motions of the linear motors 42 and 58 can be combined to create an arcuate movement path of the sprayer 46 to track movement of the teats of the cow on the rotary dairy parlor 14, with the second linear motor 58 pivoting the wand 34 and thus the sprayer 46, and the first linear motor 42 initially extending the wand 34 to locate the sprayer 46 under the udder as the cow enters the spray station 18, and then retracting the sprayer wand 34 and the sprayer 46 as the cow is in the spray station 18, and subsequently extending the wand 34 and the sprayer 46 as the cow moves further away from the spray station 18, and finally retracting the wand 34 and the sprayer 46 as the cow leaves the range of the spray station 18. The second linear motor 58 can pivot the axle 26 and the wand 34 at the same speed as or faster than rotary dairy parlor 14 rotates.

As the cow 12 enters a range of the spraying station 18, the second linear motor 58 can pivot the axle 26 (and thus the shroud 38 and the wand 34) to align with the cow (or udder), and the first linear motor 42 can extend the wand 34 to position the sprayer 46 or nozzle under the udder. As the cow rotates on the rotary dairy parlor 14 and through the range of the spray station 18, the first linear motor 42 can retract the wand 34 and the sprayer 46 while the second linear motor 58 simultaneously pivots the axle 26 and the wand 34 to a midpoint of the path of travel. Through the remainder of the path of travel, the first linear motor 42 can now extend the wand 34 and the sprayer 46 while the second linear motor 58 continues to simultaneously pivot the axle 26 and the wand 34 to the end of the path of travel. The first linear motor 42 can then retract the wand 34 and the nozzle 46 as the cow leaves the range of the spraying station 18, and the second linear motor 58 can pivot the axle 26 and the wand 34 back to the starting point. The wand 34 can have a range of motion of approximately 45°, or between 35° and 45°.

The system 10 and the spray station 18 can also have a controller 62 coupled to the linear motors 42 and 58 to control the motion of the wand 34, and the position of the sprayer 46. In addition, the system 10 and the spray station 18 can have a vision system 66 with a laser configured to identify a location of rear legs of the dairy cow as the dairy cow rotates on the rotary dairy parlor 14 through the spray station 18. The vision system 66 and the laser can sense when the first leg (right rear leg) passes the vision system 66, and then when the second leg (left rear leg) passes the vision system 66. The controller 62 can be coupled to the vision system 66, and can calculate a distance of the rear legs of the dairy cow, a distance between the rear legs of the dairy cow, a location of the udder (and thus the teats) based on the location of the rear legs of the dairy cow, and an extension distance based on the location of the rear legs of the dairy cow and the location of the udder. In addition, the vision system 66 and the laser can measure a distance of the legs from the vision system (and thus from a perimeter of the rotary dairy parlor 14). Thus, the controller 62 can also calculate a location of the udder (and thus the teats) based on the location of the rear legs of the dairy cow.

In addition, the spray system 10 can sense, measure and calculate the movement of the wand 34 for a subsequent cow while the sprayer 46 is spraying a prior cow. While the system 10 is spraying the udder and teats of a first cow, the rear legs of a second cow can be identified and the control 62 can calculate the path of travel of the sprayer 46.

Because the vision system 66 and the laser identifies the location of the rear legs of the cow, a separator to separate the cow's rear feet is not necessary, and is believed to provide greater comfort to the cow. The location and separation of the rear legs of the cow, and thus the position of the udder and teats, can vary between cows. Thus, the system can calculate a variable path of travel for the sprayer 46 for each cow. The sprayer 46 can have a variable sweep, with variable speed, distance, and travel path. The travel path of the sprayer 46 can be determined based on the separation between the cow's rear legs. The controller 62 can be coupled to existing controllers of the rotary dairy parlor 14, or the controllers of the rotary dairy parlor can be coupled to the station 18 to control movement of the wand 34 and the linear motors 42 and 58. The controller 62 can comprise a driver and a power supply for each of the linear motors.

However, the system 10 includes high-cost and potentially unreliable components, such as the vision system 66, which can sometimes become dirty and dysfunctional, or which can mistake other structures for a cow's leg(s). In addition, the need to coordinate the movements of the linear motors 42 and 58 may unnecessarily complicate the system, and the lack of integration of the system 10 with the dairy parlor 14 leads to a loss of some potential efficiencies.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a sprayer system, comprising a wand having a nozzle at a first end thereof; a rotary arm configured to rotate around a first axle, connected at a first end thereof through a rotating or rotatable connection mechanism to a second end of the wand opposite from the first end of the wand; a motor configured to drive rotation of the rotary arm; a housing covering or enclosing a part of the wand, the rotary arm, and a rotatable ring through which the wand passes; a support, configured to mechanically support the housing, the motor and/or the rotary arm; and a controller or control panel configured to control rotation of the rotary arm. The wand, the rotary arm and the ring are configured so that rotation of the rotary arm causes the nozzle to move in a circular, elliptical and/or oval pattern.

In one or more embodiments, the rotary arm rotates 360° around the first axle. The nozzle generally rotates in the circular, elliptical and/or oval pattern in a direction opposite from the direction of rotation of the rotary arm (e.g., when the rotary arm rotates in a counterclockwise direction, the nozzle rotates in a clockwise direction). The rotating or rotatable connection mechanism may comprise a bearing, which may be on or around a first post or a second axle, and a connector connected to the second end of the wand. The bearing and the connector may be integrated, and generally, also rotate around the first post or the second axle in the direction opposite from the rotation direction of the rotary arm.

In various embodiments, the ring is slidingly secured directly or indirectly to the housing or support. In other or further embodiments, the sprayer system may further comprise a slot within the housing, along which the ring may slide. The slot may have an axis (i) in a vertical plane bisecting the sprayer housing along the housing width (e.g., in a plane that bisects the housing along a plurality of midpoints of its width), and/or (ii) that is parallel with the rotary arm and the wand when the rotary arm and the wand are parallel with each other.

In some embodiments, the support may comprise a support base, a post connected to the support base, a housing base connected to the housing and the post, and a support arm connected to the housing and either the housing base or the post. The support arm may support the rotating arm, the ring and/or the wand. In one example, the post and the housing base are unitary. In another example, the housing base may be absent.

In other or further embodiments, the wand comprises a hollow tube, and the system further comprises a tank configured to store a liquid, a hose configured to supply the liquid from the tank to the wand, and/or a valve along the hose configured to open and close in response to a valve control signal from the controller or control panel. For example, the liquid may comprise a disinfectant. In various embodiments including the tank, the system may further comprise at least one of (i) a pump configured to supply the liquid from the tank to the hose and (ii) a pressure source configured to increase a pressure of a gas in the tank. Additionally or alternatively, the valve control signal keeps the valve closed when the rotary arm and the wand are at an angle between 0° and 90° and between 270° and 360°, and the valve control signal can open the valve only when the rotary arm and the wand are at an angle of from 90° to 270°. This angle may be relative to a predetermined or default 0° angle, in which the rotary arm and the wand overlap and/or the wand is retracted into the housing and/or away from the rotary structure on which the object or subject to be sprayed is located) to the maximum extent possible.

In some embodiments, the sprayer system further comprises an encoder configured to determine a position of and/or a location on a rotary structure on which an object or subject to be sprayed by the sprayer system is placed. In such embodiments, the rotations of the rotary arm may be synchronized to the position (or a plurality of such positions) of the rotary structure. For example, when the rotary structure is a rotary milking parlor comprising a plurality of stalls, each rotation of the rotary arm may correspond to movement or rotation of the milking parlor by a distance or angle equal to one stall width.

In further embodiments, the encoder may comprise a wheel on a third axle or shaft, configured to (i) contact a smooth, at least substantially circular surface of the rotary structure and/or (ii) measure a distance that the smooth, at least substantially circular surface moves. In other or even further embodiments, the encoder may further comprise a code disc to which the third axle or shaft is operably connected, configured to rotate as the wheel turns, and/or a cable configured to carry a signal containing information relating to rotation of the code disc. This signal is received directly or indirectly by the controller or control panel, and is used to determine the distance that the rotary structure travels.

In some embodiments, the present sprayer system further comprises one or more markers or beacons, and a proximity detector that recognizes each of the markers or beacons and transmits a signal directly or indirectly to the controller or control panel that designates or indicates a known position on the rotary structure from which the distance can be measured. Each of the markers or beacons may be in a predetermined position on or adjacent to the rotary structure (e.g., on or adjacent to its outer circumference). The present sprayer system may also further comprise an object sensor configured to identify a presence or absence of the object or subject on the rotary structure to be sprayed (e.g., the mammal or cow). The object sensor may comprise an optical or acoustic sensor configured to detect the object or subject (e.g., in the current stall or the next stall), or a scale (e.g., configured to determine the presence or absence of an object or subject having at least a predetermined minimum mass).

Another aspect of the present invention relates to a rotary milking parlor, comprising an outer rim or circumference, a plurality of radially-distributed stalls within the outer rim or circumference, and the present sprayer system, adjacent to and outside the outer rim or circumference. The rotation of the rotary arm is synchronized to and/or controlled by rotation of the milking parlor. For example, the controller or control panel may be configured to rotate the rotary arm (i) in a same direction as the rotation of the milking parlor and (ii) at a rate that is dependent on and/or proportional to a rate of the rotation of the milking parlor. In additional embodiments, the milking parlor rotates and the nozzle sweeps under a milk-producing mammal in one of the stalls in the same direction (e.g., the same linear direction).

In various embodiments, the rotary arm has a first length, the sprayer wand has a second length, and the ring has a position selected or defined so that the nozzle has a linear velocity substantially matching the linear velocity of the outer rim or circumference of the milking parlor. Alternatively or additionally, the rotary arm may rotate at a rate so that the linear velocity of the nozzle matches or slightly exceeds the linear velocity of the milking parlor at its circumference. In yet another example, the rotary arm and the nozzle may have an angular velocity about equal to the angular velocity of the milking parlor times the number of stalls in the milking parlor.

In other or further embodiments, the milking parlor may have from 12 to 130 stalls. Each of the stalls has a width, and in some embodiments, the nozzle crosses the outer circumference and enters the stall within 25% of the midpoint (or any other maximum percentage less than 25%, such as 20%) of the stall along its width.

In further aspects, the present invention also concerns methods of making and using the sprayer system. The method of making the sprayer system may comprise operably connecting the motor, the housing, and the controller or control panel to the support; operably connecting the rotary arm to the motor and/or the first axle; operably connecting the bearing and the wand to the rotary arm, passing the wand through the ring, and securing the ring directly or indirectly to the housing; and electrically connecting the controller or control panel to the motor.

The method of disinfecting teats of a milk-producing mammal may comprise placing or guiding the mammal to a stall in a rotary milking parlor; rotating the rotary milking parlor; operating the present sprayer system such that the nozzle sweeps under the teats of the mammal in the stall in the same linear direction as the rotary milking parlor (e.g., when the parlor is rotating forward); and spraying a disinfectant through the nozzle when the nozzle sweeps under the teats of the mammal. In preferred embodiments, the milk-producing mammal is a cow, and the milking parlor is a rotary milking parlor, but the invention is not so limited.

A further aspect of the present invention relates to a non-transitory computer-readable medium, comprising a set of instructions encoded thereon and adapted to operate the present sprayer system and/or perform the present method of disinfecting (e.g., one or more mammals in a rotary milking parlor). The set of instructions are adapted to operate the present sprayer system such that the nozzle sweeps under the teats of the mammal in the stall in a same linear direction and at substantially a same linear rate or speed as the rotary milking parlor is moving, and spray a disinfectant through the nozzle when the nozzle sweeps under the teats of the mammal.

The present invention advantageously provides greater and more reliable coverage of the object being sprayed than does the sprayer of U.S. Pat. No. 10,757,907, with fewer moving parts, and no need for a relatively expensive and potentially problematic machine vision or other optical detection system. These and other advantages of the present invention will become readily apparent from the detailed description of various embodiments below.

DETAILED DESCRIPTION

Figure 1:
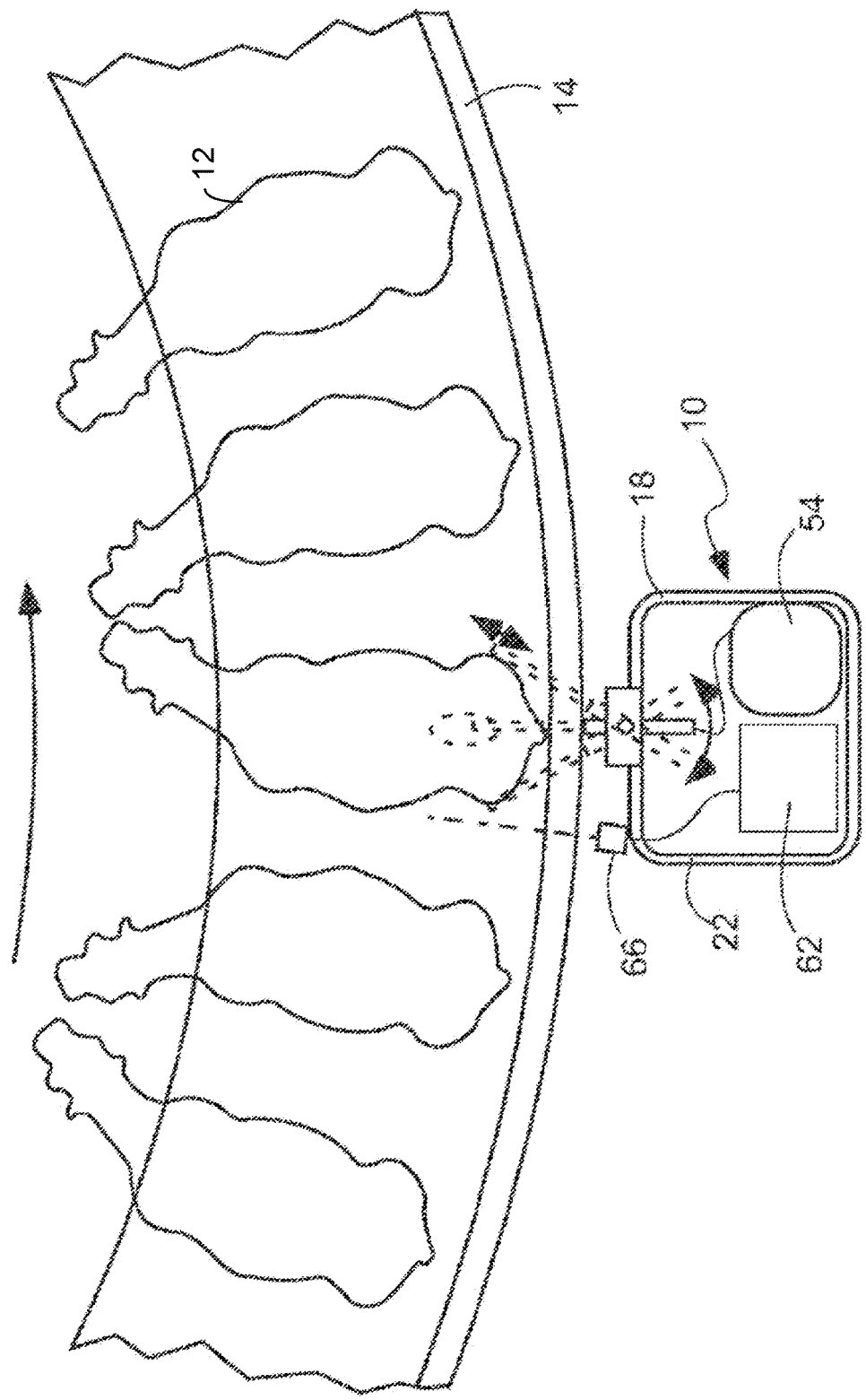
FIGS. 1-3 are diagrams of a conventional cow teat disinfecting system according to U.S. Pat. No. 10,757,907.
Figure 2:
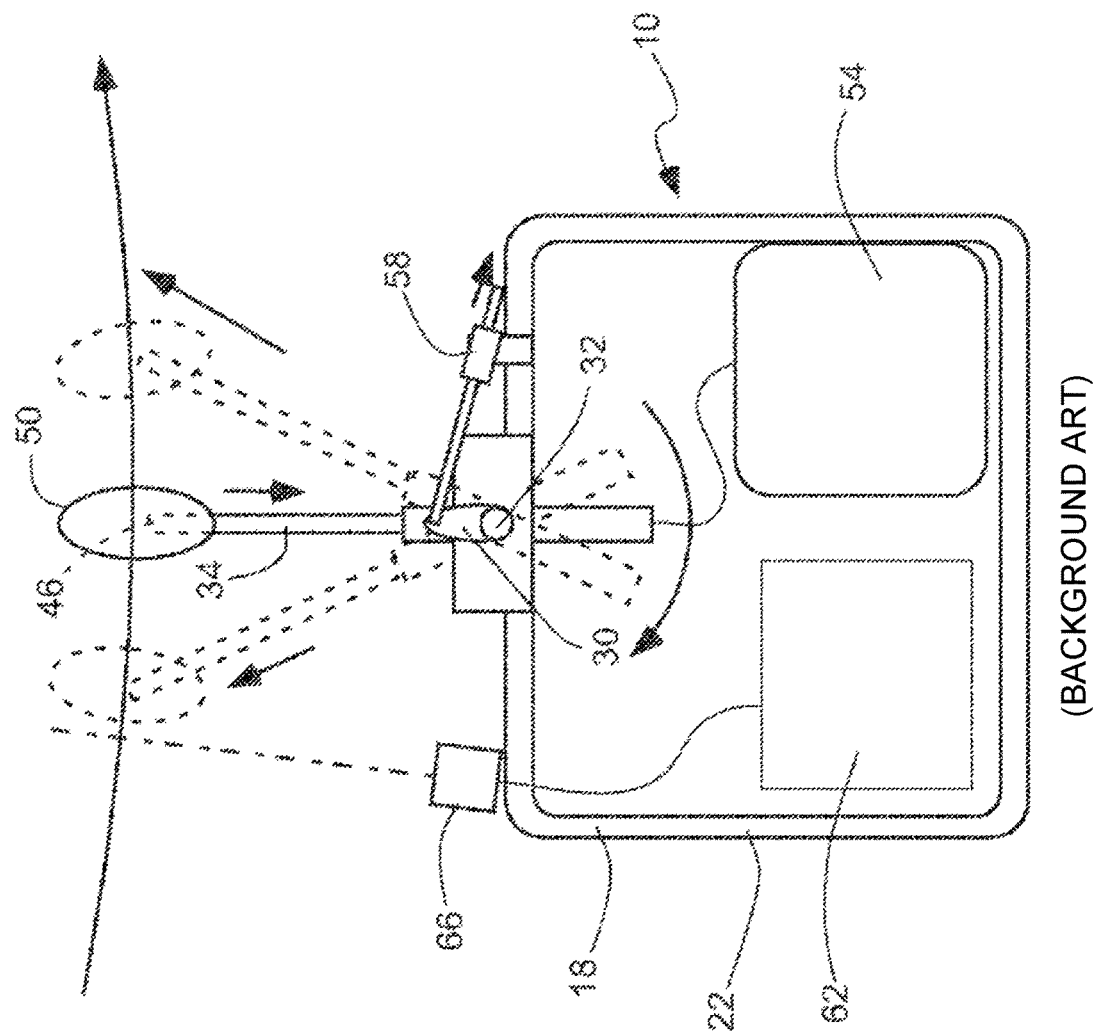
Figure 3:
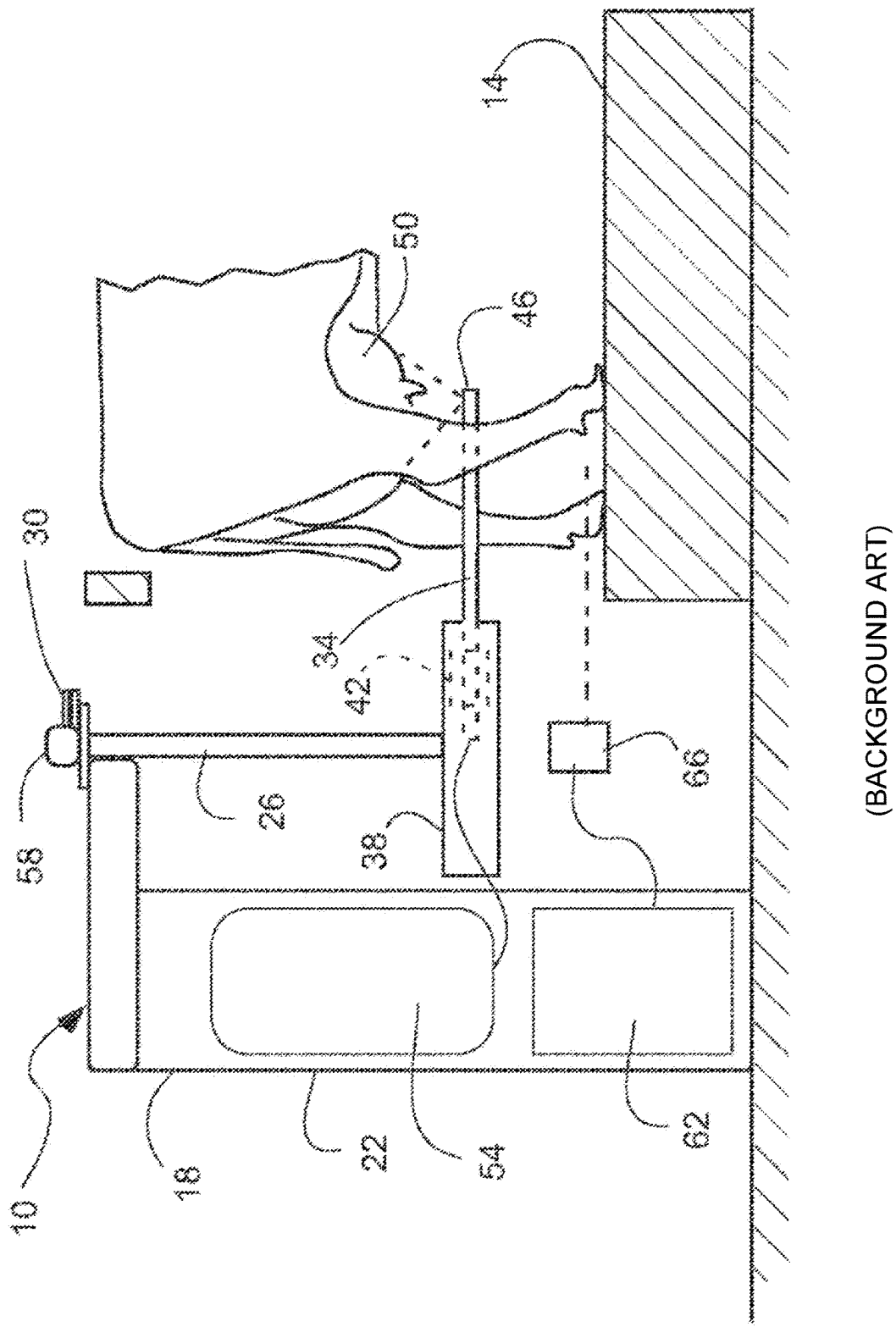

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

For the sake of convenience and simplicity, the terms "connected to," "coupled with," "coupled to," "joined to," "attached to," "fixed to," "affixed to," "in communication with," and grammatical variations thereof may be used interchangeably, and refer to both direct and indirect connections, couplings, joints, attachments and communications (unless the context of its use unambiguously indicates otherwise), but these terms are generally given their art-recognized meanings. The terms "lower" and "upper" are used herein as convenient labels for the same or similar structures having a relative position to the other(s) as shown in the drawings, but which can change their relative position(s) depending on the orientation of the apparatus or other structure in the drawing(s). In addition, the terms "circumference" and "outer rim" are used interchangeably, and the use of one such term includes the other, unless the context of its use clearly indicates otherwise.

Herein, a "circular, elliptical and/or oval pattern" refers to a pattern (e.g., of movement) that is completely circular, completely elliptical, completely oval, or partially circular, elliptical or oval and partially one or more of the other shapes. For example, the pattern, which generally repeats cyclically and/or periodically, may have one or more sections that are elliptical and one or more sections that are circular or oval; one or more sections that are circular, and one or more sections that are elliptical or oval; one or more sections that are circular, one or more sections that are elliptical, and one or more sections that are oval, etc.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as may be apparent from the following detailed discussion, throughout the present application, terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

The present invention concerns an improved, yet simplified, version of the teat disinfecting system disclosed in U.S. Pat. No. 10,757,907. However, the present sprayer (e.g., teat disinfecting) system includes (1) an arm that rotates 360° and (2) a ring along the length of a sprayer wand connected to the rotating arm to control the position of a nozzle at the end of the wand. This arrangement imparts a novel sweeping motion to the path of the nozzle that is beneficial for matching the linear and/or angular speed of the nozzle to that of the rotary support platform on which the object being sprayed is placed or positioned, thereby ensuring adequate coverage of the object being sprayed as the rotary support platform moves (rotates).

The invention, in its various aspects, will be explained in greater detail below with regard to exemplary embodiments.

An Exemplary Spraying System

In one aspect, the present invention relates to a rotary spraying system. In some embodiments, the present spraying system is used in conjunction with a rotary milking parlor (e.g., for milking cows), to spray disinfectant on the teats of the mammal prior to milking and reduce or eliminate the risk of the milk being collected from contamination. However, the present spraying system may be used with other mammals (e.g., goats, sheep), and to spray other objects (e.g., mechanical parts) on any rotary support platform or frame with a liquid (e.g., paint, water repellant, etc.) as the rotary support platform or frame rotates. While the present spraying system is particularly advantageous for spraying the underside of an object (i.e., spraying a liquid upwards), it can be used to spray a liquid in essentially any direction (e.g., downward, horizontally, at an angle other than 0° or 90°, etc.).

FIGS. 4A-D show an exemplary embodiment of the present system 100, including a housing 110 enclosing a motor (not shown) and other components, a sprayer wand rotating section 120, a sprayer tube or rod 130, a sprayer tip 140, a control panel 150, and a support 160. The sprayer tube or rod 130 and sprayer tip 140 are joined by a connector 144, and together constitute a sprayer wand, with which the disinfectant solution is applied to the cow's teats. In some embodiments, the connector 144 comprises a spring in the form or shape of a cylindrical tube (see, e.g., FIG. 9), which enables the sprayer tip 140 to bend or flex upon application of a relatively small force to it (e.g., for animal and human safety reasons). In the embodiment shown in FIGS. 4A-D, the sprayer tip 140 comprises a hollow tube or cylinder, and the sprayer tube or rod 130 comprises either a hollow tube/cylinder or a solid rod. In other embodiments, the sprayer wand has only a single tube (e.g., a sprayer tube 130), with the nozzle 142 connected thereto.

The housing 110 may have an upper cover (not shown), covering the wand rotating section 120, most of the sprayer tube or rod 130, and a ring 132 through which the sprayer tube or rod 130 passes. The wand rotating section 120, which includes a rotary arm 122 that rotates around a first axle 123, a bearing 124 on a short post or second axle 125, and a wand fastening unit 126, extends the sprayer tip 140 under the cow and between the cow's rear legs, and sweeps the nozzle 142 at the end of the sprayer tip 140 below the cow's udder. The motor drives rotation of the rotary arm 122 around the first axle 123, which results in the sweeping motion of the nozzle 142. In some embodiments, the motor is a conventional linear motor, a conventional stepper motor, or both (e.g., a conventional linear stepper motor). Alternatively, the motor can also be a conventional rotary motor.

In one embodiment, the rotary arm 122 rotates counterclockwise, as shown by the arrow on the motor housing 110. In the example of FIGS. 4A-D, the milking parlor 200 also rotates counterclockwise, as shown by the arrow on the milking parlor 200. The ring 132 through which sprayer tube or rod 130 passes is secured directly or indirectly to the motor housing 110 or another immovable part of the sprayer system 100 (e.g., the support arm 174 in FIG. 5). Thus, the nozzle 142 sweeps under the cow in the same linear direction that the milking parlor 200 rotates.

In some embodiments, the system further includes an object sensor configured to determine whether there is a cow or other mammal in the stall into which the sprayer nozzle 142 is to enter. In one example, the object detector comprises an optical sensor, but alternative sensors may include acoustic sensors (e.g., using radar, ultrasound or similar acoustic waves), a scale (e.g., detecting the presence of the cow when a mass exceeding 250-300 kg or other minimum a threshold mass is on the scale in the stall), etc. In such embodiments, when a cow is not detected in the stall, the rotary arm 122 may remain at the "home" position (e.g., 12 o'clock; see FIG. 4A) until a cow is detected in one of the successive stalls.

Figure 4A:
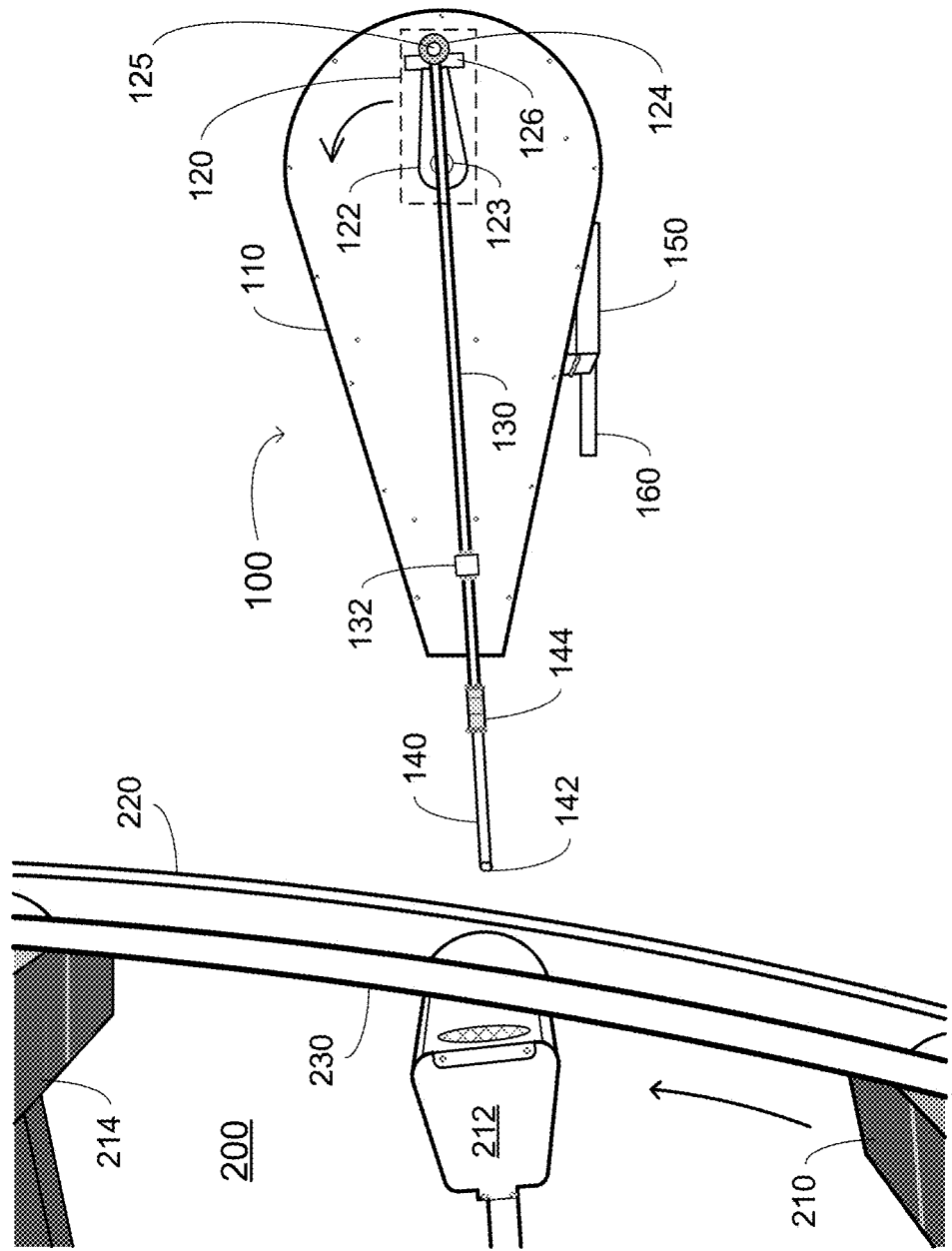
FIGS. 4A-D shows an exemplary sprayer in use with a rotary milking parlor in accordance with one or more embodiments of the present invention.

In FIG. 4A, the rotary arm 122 is at 12 o'clock, pointing away from the milking parlor 200 and retracting the wand into the housing 110 and away from the rotary milking parlor 200 to the maximum extent. As the rotary arm 122 rotates (see FIG. 4B), the bearing 124 and the wand fastening unit 126 also rotate (e.g., clockwise with respect to the post or axle 125), and the end of the sprayer tube or rod 130 secured to the wand fastening unit 126 rotates along the same path or a similar path as the end of the rotary arm 122. Because the ring 132 is fixed in a slot 134 having an axis parallel with the rotary arm 122 at 12 o'clock (e.g., in a plane that vertically bisects the housing 110 along its width), this causes the nozzle 142 at the opposite end of the wand from the wand fastening unit 126 to rotate in the opposite direction (e.g., clockwise). The slot 134, which is not visible in FIG. 4A, allows the position of the ring 132 to be adjusted towards the parlor 200 or away from the parlor 200. Returning to FIG. 4B, the bearing 124 also rotates about the post or second axle 125 in the direction opposite from the bearing 124 and the wand fastening unit 126 (e.g., clockwise). As a result, the mechanism in the wand fastening unit 126 that secures the sprayer tube or rod 130 (e.g., an opening into which the sprayer tube or rod 130 is secured, a nipple onto which the sprayer tube or rod 130 is fastened, etc.) always faces the milking parlor 200. In one embodiment, the bearing 124 and the wand fastening unit 126 are unitary (integrated into a single physical unit).

Figure 4B:
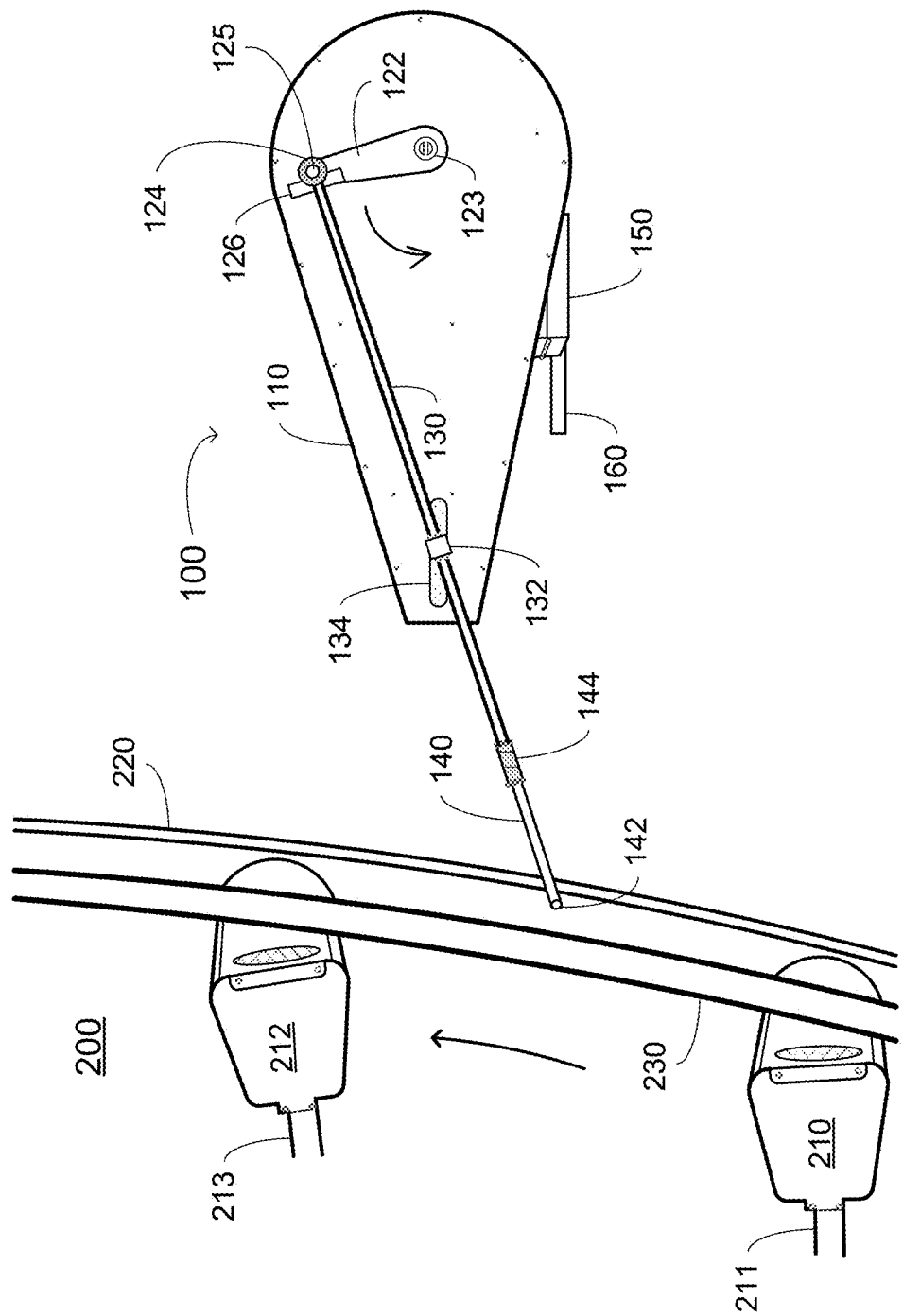

In FIG. 4B, the rotary arm 122 is at about 9 o'clock. As the bearing 124 and the wand fastening unit 126 move toward the milking parlor 200, the end of the rotary arm 122 rotates towards the milking parlor 200, and the nozzle moves into the milking parlor 200 between adjacent stall cabinets 210 and 212, ideally about equidistant from the adjacent stall cabinets 210 and 212. In the rotary milking parlor 200, a stall for one cow to be milked is generally the space between the stall cabinets 210 and 212 and the poles/barriers 211 and 213 extending therefrom. The stall cabinets 210 and 212 may also house some or all of the electronic controls for the milking claw (to be used to obtain milk from the cow when the cow is safely in the stall and the cow's teats have been disinfected). The ring 132 is supported at least in part by a bearing or other rotatable fixture (e.g., a rotary joint; not shown) between the ring 132 and a connection mechanism (also not shown) in and/or below the slot 134 that allows the ring 132 to rotate in a plane parallel with the floor of the milking parlor 200. The connection mechanism securing the ring 132 to the slot 134 or a structure below the slot typically comprises a threaded axle (which passes through the slot) and (i) a flange (e.g., above the threads on the axle) and an opposing nut and washer, or (ii) opposing nut-and-washer fasteners on the threaded axle, on opposite sides of the slot, but other connection mechanisms that reversibly secure the ring 132 in place in the slot 134 are also suitable. In such embodiments, the ring 132 is secured around the sprayer tube or rod 130, but the sprayer tube or rod 130 slides through the ring 132 as the rotary arm 122 rotates and the sprayer tube or rod 130 changes position. Alternatively, the ring 132 may move linearly in (or slide along) the slot 134.

Figure 4C:
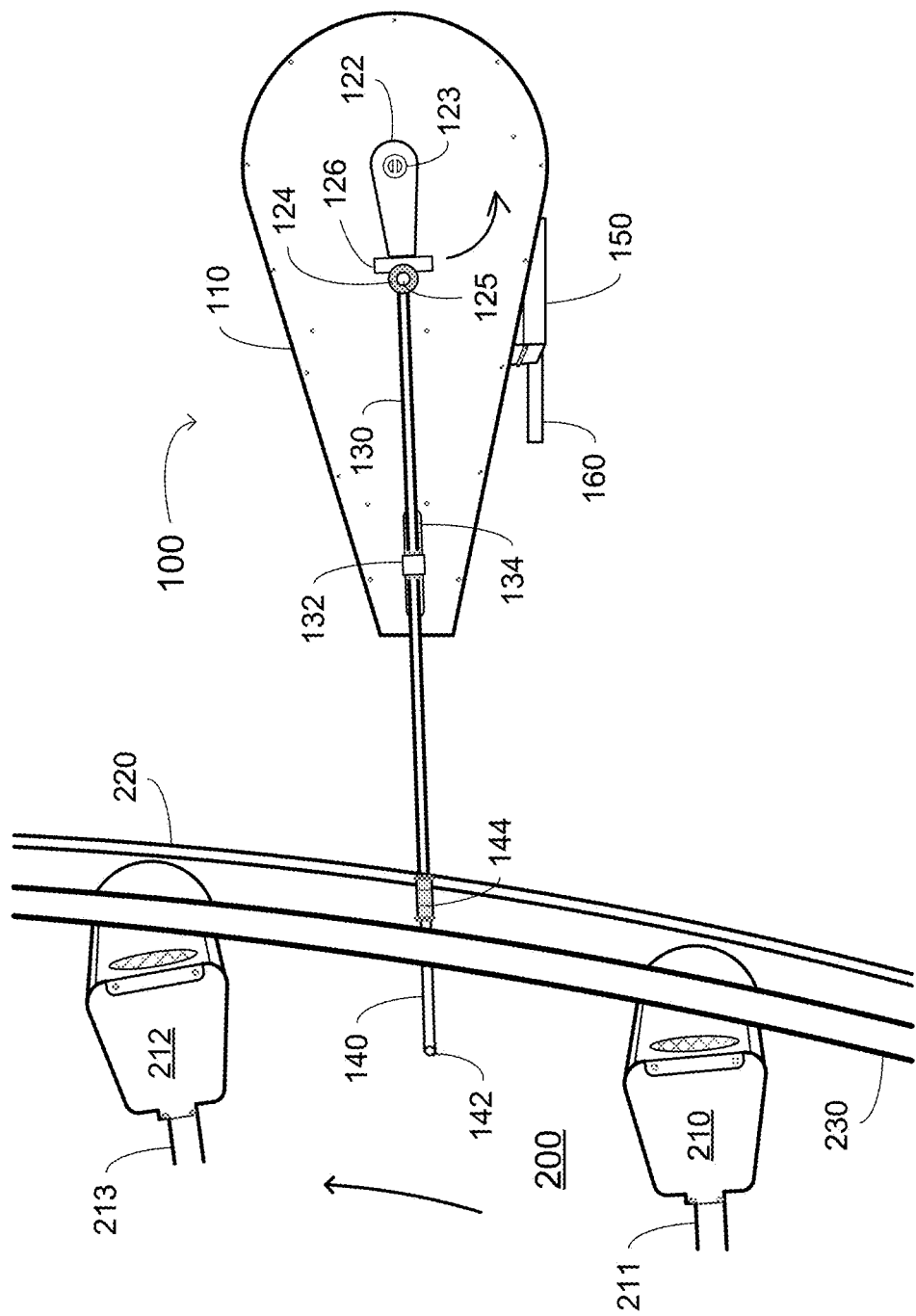

Referring now to FIG. 4C, the rotary arm 122 is at about 6 o'clock, and the nozzle 142 is extended about as far into the stall of the milking parlor 200 as possible. In a typical rotary milking parlor 200, the cow's rear legs are just inside the retainer 230. As shown in FIG. 4C, the nozzle 142 is still about equidistant (e.g., at the midpoint) between the two stall cabinets 210 and 212. In some embodiments, the rotation rate of the rotary arm 122 is set so that the linear velocity of the nozzle 142 in the direction from stall cabinet 210 to stall cabinet 212 matches or slightly exceeds the linear velocity of the milking parlor 200 in the same direction at its circumference 220. This is typically controlled at least in part with an encoder (discussed with regard to FIG. 6) and a microcontroller on the control panel 150. In further embodiments, the length and the rotation rate of the rotary arm 122, the length of the sprayer wand, and the position of the ring 132 may also be selected or defined so that this "linear velocity matching" relationship is met. In other or further embodiments, the angular velocity of the rotary arm 122 (and thus, the angular velocity of the nozzle 142) is generally equal to the angular velocity of the milking parlor 200 times the number of stalls in the milking parlor 200. In typical commercially-available milking parlors, the number of stalls may be from 12 to 130, or any number or range of numbers therein (e.g., 40 to 100). The number of stalls is typically (but not always) an even number, and when the number of stalls is 40 or more, it is often a multiple of 10.

Figure 4D:
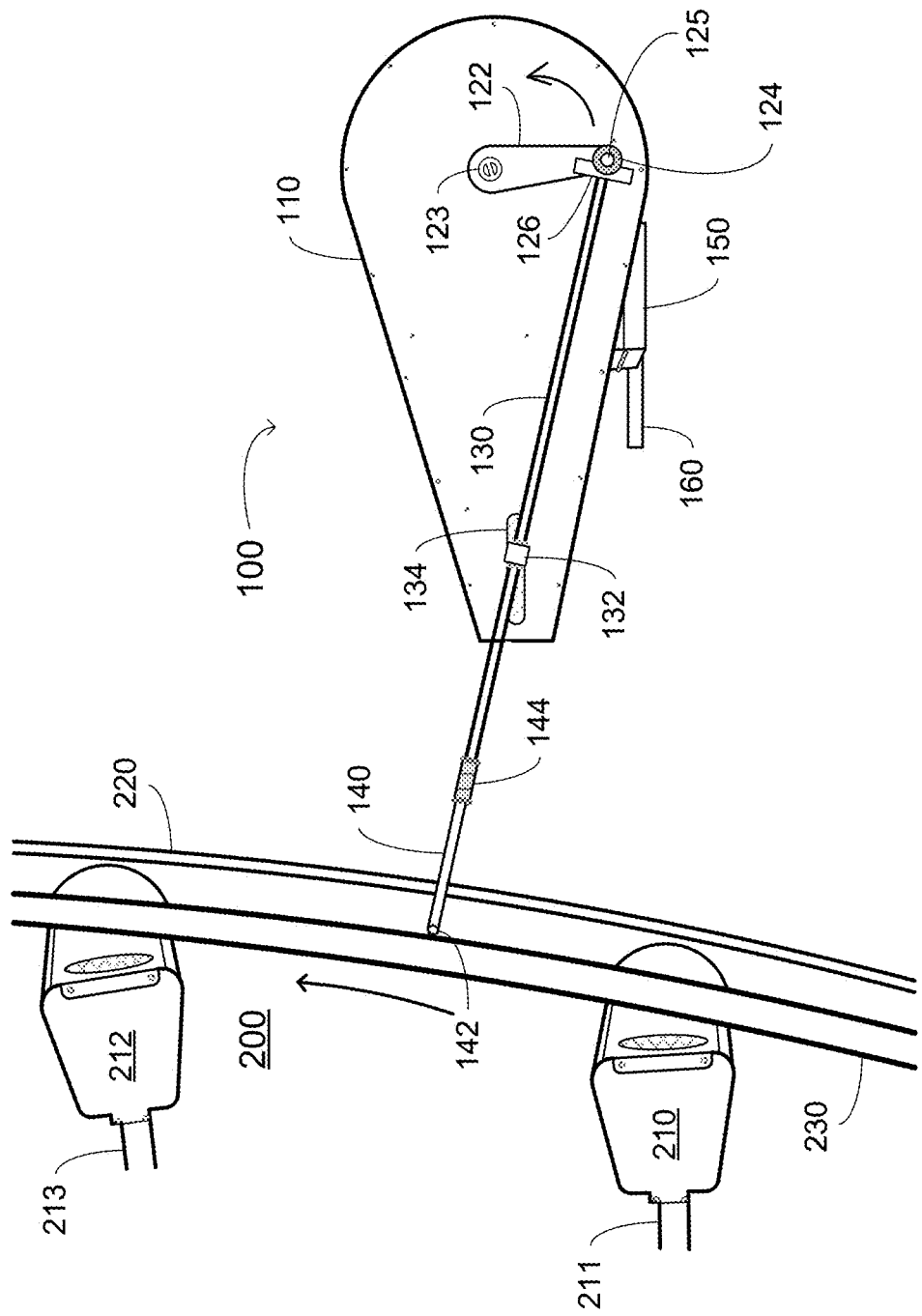

FIG. 4D shows the rotary arm 122 at about 3 o'clock. The nozzle 142 is leaving the space of the milking parlor 200 and being drawn back towards the sprayer system 100, while at the same time, it is moving to the left of the sprayer system 100 (the narrow end of the sprayer system being its "face") to the next stall in the milking parlor 200, completing the spraying cycle. In one embodiment, the control panel 150 is configured to instruct the rotary arm motor to return the rotary arm 122 to a "home" position (e.g., where the rotary arm 122 and the sprayer tube or rod 130 are aligned at 12 o'clock or 0°, as shown in FIG. 4A) relatively quickly. For example, the rotary arm 122 may rotate to the "home" position at a rate or speed greater than any rate or speed at which the rotary arm 122 is rotated when the rotary arm moves from 12 o'clock (FIG. 4A) to 3 o'clock (FIG. 4D). This "fast return to home" function advantageously reduces the likelihood of a collision between the nozzle 142 or sprayer tip 140 and the rotary parlor 200 or an object thereon (e.g., the cabinet 210, the rail 230, a cow, etc.), and it allows the sprayer system some time at the end of each rotation of the rotary arm 122 to pause and to effectively reset the system. For example, when the rotary arm 122 rotates continuously at a fixed speed, and there is a difference in the lengths of time during which the rotary arm 122 completes one rotation and the rotary parlor 200 advances one stall width, the time difference accumulates over repeated rotations of the rotary arm 122.

The disinfectant is sprayed onto the cow when the rotary arm 122 is in an arc from about 8 o'clock to about 4 o'clock, or any range therein. For example, if the rotary arm 122 and the sprayer tube or rod 130 aligned at 6 o'clock is a reference point (e.g., 180°), then the disinfectant may be sprayed onto the cow from 135° to 225°, or any range therein, such as 150° to 210°.

Figure 5:
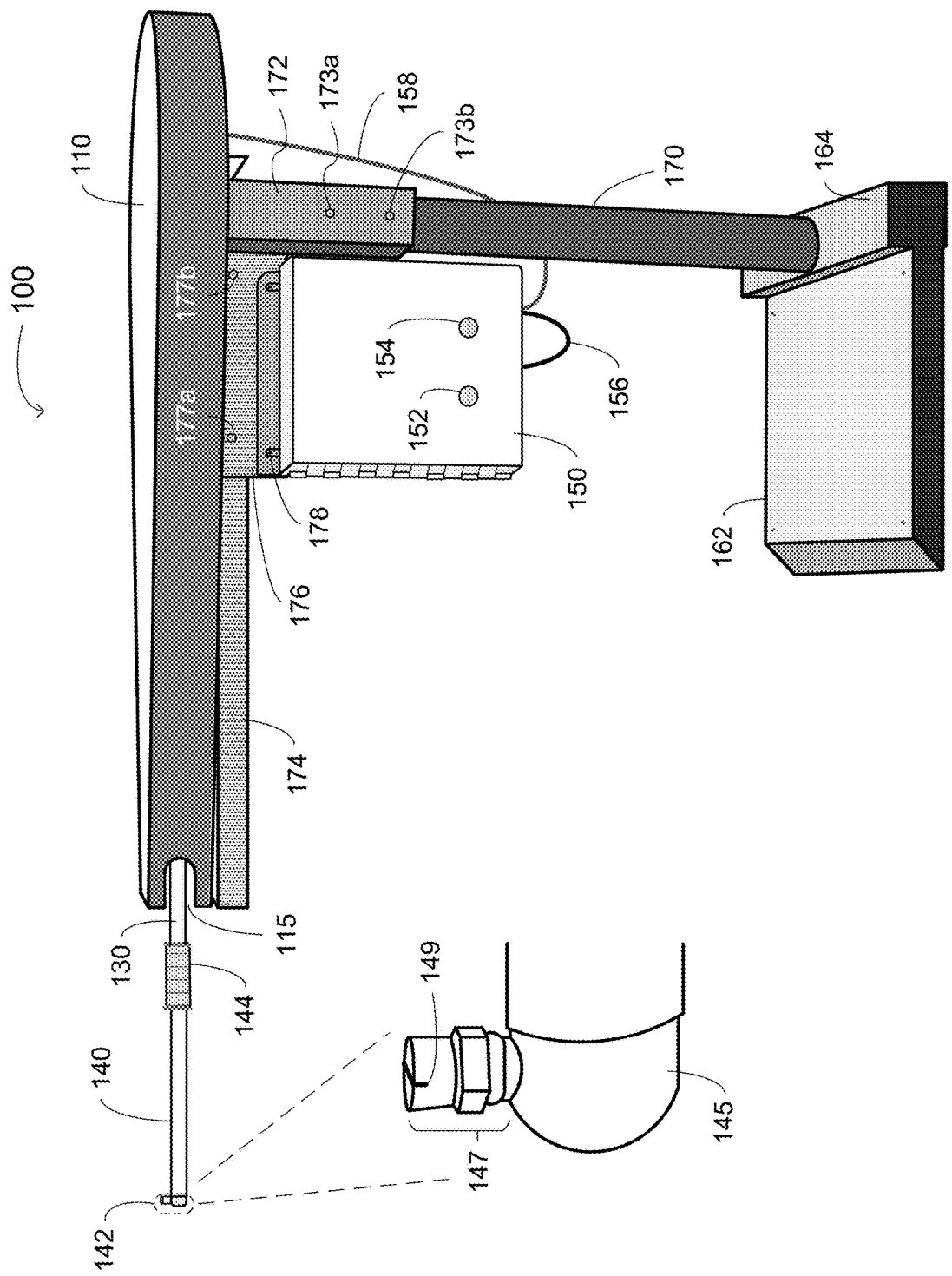
FIG. 5 shows a side view of the exemplary sprayer of FIGS. 4A-D.

FIG. 5 shows a side view of the sprayer system 100. The cover of the housing 110 protects the wand rotating section 120, the ring 132 and the slot 134 from dirt, debris and other forms of potential damage. The housing 110 is supported by a post 170 and a support arm 174. The housing 110 is connected to the post 170 by a housing base 172. The housing base 172 has an opening therein configured to receive the post 170. For example, when the post 170 is cylindrical, the opening in the housing base 172 has a diameter equal to or slightly larger than that of the post 170. The housing base 172 is secured to the post 170 by bolts or screws 173a-b. thus, the height of the combined post 170 and housing base 172 is adjustable. Typically, the height of the combined post 170 and housing base 172 is such that the sprayer wand 130-140 is 2-10 cm above the floor of the milking parlor 200. In some embodiments, the height of the combined post 170 and housing base 172 may be in the range of 75-125 cm (30-50 inches), or any height or range of heights therein.

The post 170 is secured to an alternative base or pedestal 162, which may be square, rectangular, circular or oval in shape. In the example shown in FIG. 5, the post 170 is mounted on a riser 164 at one end of the base or pedestal 162, but the invention is not limited to such a design. For example, the support 160 (FIGS. 4A-D) may have any of a number of shapes, such as an H-shape, and X-shape, a C- or U-shape, etc. Typically, the post 170, the support arm 174, the housing base 172, and the base or pedestal 162 (or the support/footer 160) comprise a metal or metal alloy such as steel, aluminum, or titanium.

The support arm 174 is secured to the housing base 172 (e.g., by welding, a plurality of bolts or screws, an adhesive, a combination thereof, etc.). The support arm 174 has a length less than that of the housing 110 and a width about equal to, slightly greater than, or slightly less than (e.g., within ±25%, inclusive) the width of the housing 110 at the open end (i.e., where a carve-out 115 is located). The optional carve-out 115 (which, when present, is typically in both sidewalls of the housing 110) allows for full back-and-forth periodic and/or pendular movement of the sprayer tube or rod 130, although the open end of the housing 110 may have a width permitting such movement of the sprayer tube or rod 130 without the carve-out 115.

FIG. 5 also includes an expanded view of the nozzle 142. The nozzle 142 includes a cap 145 with an opening therein configured to receive a spray attachment 147. The cap 145 may be secured to the sprayer tip 140 by a threaded (screw-type) connector, an adhesive, etc. The spray attachment 147 may be secured in the opening of the cap 145 with a threaded/screw-type connector, a bayonet-type (e.g., peg-in-slot) connector, etc. The spray attachment 147 shown in FIG. 5 has a fan-type or flat spray slot 149, but nozzles with other spray patterns are acceptable, such as a shower-type spray pattern, a cone-type spray pattern, etc.

The control panel 150 in FIG. 5 is shown with a hinged cover, but other protective covers are also acceptable. Optionally, the control panel 150 may have one or more control buttons or knobs 152 and 154 thereon, which may be used to select an operational mode (e.g., a calibration mode button and a normal operation mode button). Alternatively, the control buttons or knobs 152 and 154 may include an on/off button, a spray pressure control knob, etc. The control panel 150 may be electrically connected to a parlor position detection device, such as a distance or angle detector and an encoder (e.g., FIG. 6) configured to encode the distance or angle information from the detector for the control panel 150, via wire or cable 156. The control panel 150 sends signals and/or instructions to the wand rotating section 120 via wire or cable 158. The control panel 150 may be mounted onto a mounting panel 176 using a plurality of fasteners 178, such as bolts, screws, rivets, nut-and-bolt fasteners, etc. The mounting panel 176 may be secured to the support arm 174 using a plurality of fasteners 177*a-b*, such as bolts, screws, rivets, nut-and-bolt fasteners, etc. Alternatively, the control panel 150 may be mounted directly onto the support arm 174.

Figure 6:
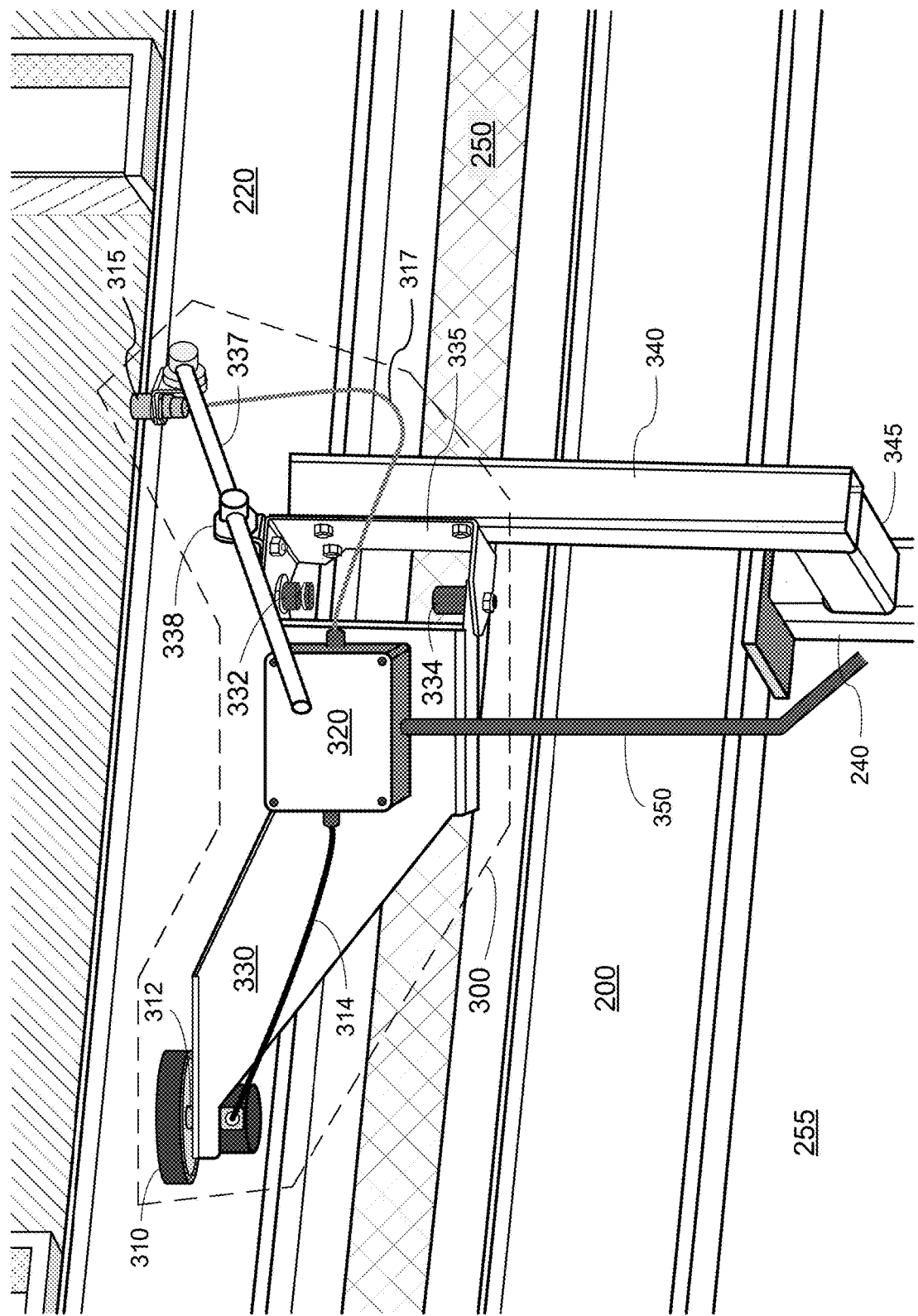
FIG. 6 shows an exemplary encoder for use with the present spraying system in accordance with one or more embodiments of the present invention.

FIG. 6 shows an exemplary rotary encoder 300, mounted inside the outer rim (circumference) 220 of the rotary milking parlor 200. The encoder 300 may comprise one or more wheels 310, a proximity detector 315, and a support frame 330. The support frame 330 may be mounted on or secured to a support post 340 using a bracket 335. The support post 340 may be joined or connected to a support arm 345, which is, in turn, mounted on or secured to a support post 240 of the rotary milking parlor 200.

The wheel 310 is in contact with a surface on the outer circumference 220 of the milking parlor 200 and mounted on an axle or shaft 312. The position of the measuring wheel 310 in the example of FIG. 6 is fixed, as the milking parlor 200 rotates. The wheel 310 directly measures the distance that the inner surface of the outer rim 220 of the milking parlor 200 moves. As the outer rim 220 moves, the measuring wheel 310 turns, rotating a corresponding code disc (not shown) to which the axle or shaft 312 is operably connected. A signal containing information relating to rotation(s) of the code disc is sent to the control panel 150 via cables 314 and 350, which are connected or joined to each other in a junction box 320.

The control panel 150 receives a signal over the cable 350 in response to the rotation(s) of the code disc(s). The length or distance that the outer rim 220 of the milking parlor 200 travels may be calculated by the control panel 150 using the signal from the encoder 300 according to known formulas and/or processes. From the measured distance and one or more known reference points on the milking parlor 200 (e.g., one or more markers or beacons along the outer rim 220 that are recognized by the proximity sensor 315, a center position of one or more cabinets 210, 212, 214, etc.), the sprayer system 100 knows where certain locations in the milking parlor 200 are. For example, when the markers or beacons are placed along the center of one or more stall cabinets 210-214, the distance between a predetermined number of cabinets (e.g., the number of stalls between adjacent markers or beacons) can be determined. Dividing that distance by the number of stalls between adjacent markers or beacons gives the average width of each stall. In one example, one marker or beacon is placed under the center of every tenth stall cabinet (e.g., when the total number of stalls in the milking parlor is a multiple of 10). When the total number of stalls in the milking parlor is a multiple of 8 (or n), for example, one marker or beacon is placed under the center of every eighth (or $n^{th}$) stall cabinet.

Given the generally-known and/or empirically-determinable likely positions of the milk-producing mammals' rear legs in each stall, the sprayer system 100 can determine where the space is between the mammals' rear legs (e.g., within 20% of the midpoint of the stall along its width), and ensure that the nozzle 142 enters each stall in that space. To increase the likelihood of the mammals' rear legs being in or near the outermost area or periphery of the stall (e.g., within 30-45 cm of the corresponding stall cabinets), a sloped riser can be placed in the center of each stall near the outer circumference 220, encouraging or forcing the cows to place their feet to the outside of the riser.

An important aspect of accurately determining the position of the milking parlor 200 with the encoder 300 is avoiding slippage between the wheel 310 and the parlor outer rim 220 or other surface of the milking parlor 200 that the wheel 310 contacts. Thus, the wheel 310 should contact a smooth, substantially circular surface of the milking parlor 200, such as the outer rim 220, the inner beam or the outer beam (not shown), and should have a coefficient of friction relative to the material of the parlor outer rim 220 adequate to ensure contact and rotation of the wheel 310 upon application of a minimum threshold force (e.g., a preload, against the parlor outer rim 220). The material of the parlor outer rim 220 is typically a metal (e.g., steel, aluminum, etc.), and in some instances, it may be coated with a rubber or other polymeric coating (e.g., latex paint). When the parlor outer circumference 220 has an inner surface (i.e., in contact with the wheel 310) comprising one or more such materials, the coefficient of friction is sufficiently high when the wheel 310 comprises rubber (e.g., vulcanized natural rubber, a silicone rubber, an acrylonitrile-butadiene-styrene [ABS] rubber, etc.), nylon or another firm, yet deformable, polymer, but the invention is not limited to such materials. The force or preload to be applied to prevent slippage of the wheel 310 may be determined after the materials for the wheel 310 and the parlor outer circumference 220 are known. In the example shown in FIG. 6, the force can be applied by a spring 360 (FIG. 7) connected between the frame 330 and the clamp 335 (which are rotatably secured to each other using bolts 332/334), or a conventional spring-loaded joint (not shown, but which could be secured to or mounted on the support post 340 or the clamp 335), but the invention is not limited to such an arrangement. Although the encoder 300 as shown in FIG. 6 includes only one measuring wheel 310, including a second measuring wheel may reduce wear-and-tear on the encoder 300, and may increase the accuracy and/or precision of the distance measurement, as well as the likelihood that at least one wheel will be in contact with a surface of the milking parlor rim 220.

In the example shown in FIG. 6, the proximity detector 315 is mounted on the bracket 335 by an extending rod 337, which is secured to the bracket 335 by a clamp 338, although the invention is not limited to such an arrangement. The proximity detector 315 may be inductive (electromagnetic), optical, ultrasonic (acoustic), etc. Thus, the marker or beacon that marks the reference location on the milking parlor 200 may comprise a small disc or plate of metal, such as iron, steel, titanium, chromium, nickel, a ferrous alloy of one of these metals, etc. Signals from the proximity detector 315 are transmitted to the control panel 150 through a cable 317 and the cable 350 (joined to each other in the junction box 320).

Figure 7:
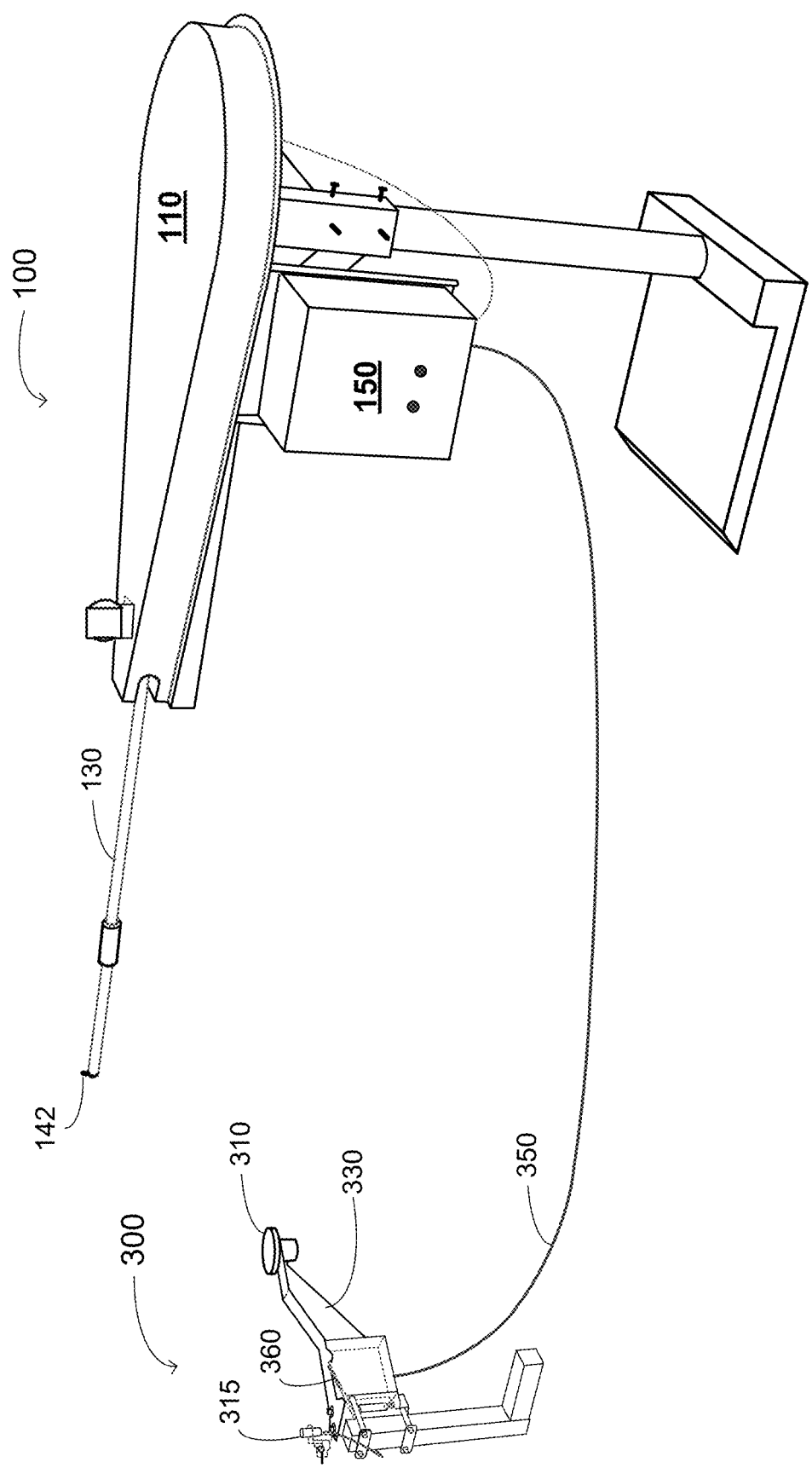
FIG. 7 shows an exemplary prototype spraying system that embodies the sprayer of FIGS. 4A-D and the encoder of FIG. 6.

As shown in the prototype system FIG. 7, the encoder 300 transmits signals relating to the position of the milking parlor 200 and the distance that the milking parlor 200 has traveled either through the cable 350 that is electrically connected to the control panel 150, or wirelessly through a transmitter and antenna (not shown) in or operably connected to the control panel 150. The wire or cable 350 may pass from the junction box 320 through a space 255 under the lower rim of the milking parlor 200 to the control panel 150 of the sprayer system 100. The milking parlor position and travel distance signals are received by a controller in the control panel 150, which then controls rotations of the rotary arm 122 (FIGS. 4A-D), and thus the position of the nozzle 142, in response to the known position of the milking parlor 200. From the travel distance information and the elapsed time (e.g., from a predetermined starting point, which can be substantially any point in time), and optionally the radius or diameter of the outer rim 220 of the milking parlor 200, the control panel 150 can determine the linear speed or velocity (instantaneous or average) of the outer rim 220 of the milking parlor 200.

Various relationships between the milking parlor position and travel distance and the position and rate of rotation of the rotary arm 122 are discussed herein. However, in some embodiment, the direction, position and rate of rotation of the rotary arm 122 are programmed to match the direction, position and rate of the milking parlor 200. For example, when the rotation rate of the milking parlor 200 increases, the rotation rate of the rotary arm 122 may increase (e.g., in proportion to the increase in the rotation rate of the milking parlor 200), and when the rotation rate of the milking parlor 200 decreases, the rotation rate of the rotary arm 122 may decrease (e.g., proportionally to such decrease). In further embodiments, when the rotation of the milking parlor 200 stops, the rotation of the rotary arm 122 also stops, and in one embodiment, when the milking parlor 200 rotates in reverse (i.e., in the opposite direction of "forward" rotation), the rotary arm 122 also rotates in reverse (e.g., at a rate proportional to the reverse rotation rate of the milking parlor 200). However, when the milking parlor 200 rotates in reverse, the rotary arm 122 may stop and stay in the "home" position until the milking parlor 200 begins rotating in the forward direction, and optionally passes or crosses the predetermined position for starting a new rotary arm rotation cycle. In some embodiments, this "rotation rate matching" feature depends on measurements of the position and/or rotation rate of the milking parlor 200 from the encoder 300 and/or proximity sensor 315, so that the control panel 150 can match the position and/or rotation rate of the rotary arm 122 accordingly.

Figure 8:
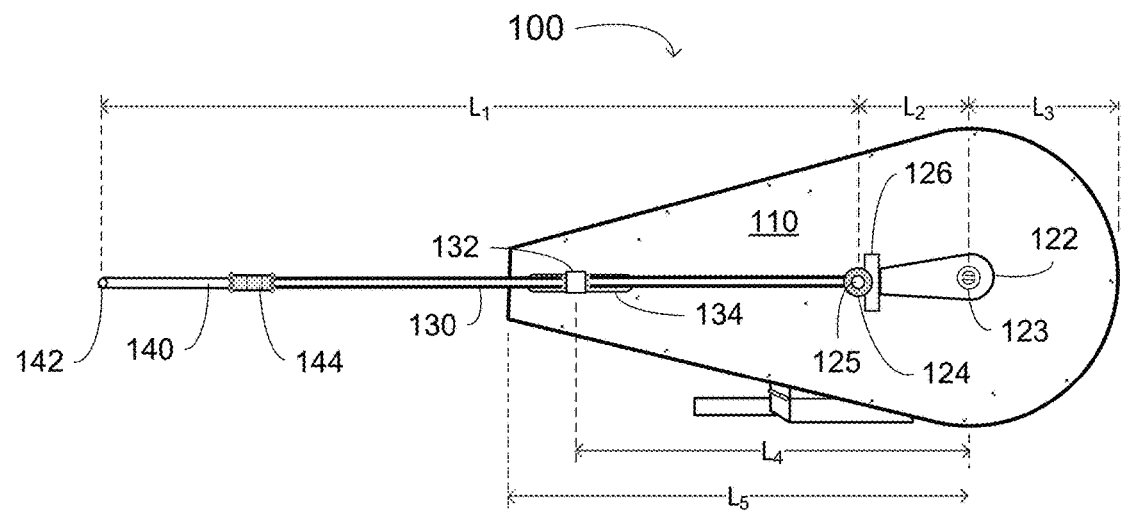
FIG. 8 is a top view of the exemplary sprayer of FIGS. 4A-D.

FIG. 8 shows a top-down view of the sprayer 100 with the wand 130/140 at a fully-extended position (e.g., the rotary arm 122 and the wand 130/140 are at a 180° angle). A number of important dimensions of the sprayer 100 are indicated in FIG. 8.

For example, the wand has a length $L_1$, which in various embodiments may be from 60 cm to 180 cm (e.g., 24-72 inches). In the example sprayer 100 in FIG. 8, the wand comprises the sprayer tube or rod 130, the sprayer tip 140, and the connector 144, but in other examples, the wand may be unitary (e.g., only the sprayer tube or rod 130). The nozzle may or may not be considered part of the wand for purposes of determining certain dimensions of the sprayer 100, as its length/diameter is generally quite small in comparison to the length $L_1$ of the wand. In embodiments for use with a rotary milking parlor, $L_1$ may be from 90 cm to 120 cm (e.g., 36-60 inches). The sprayer tube or rod 130 and the sprayer tip 140 may each independently have a cylindrical shape, and may have an inner diameter of from 5 to 25 mm (e.g., ⅜ to 1 inch) and an outer diameter of from 7 to 35 mm (e.g., ¼ to 1⅜ inch).

The distance $L_2$ between the center of the wand post or axle 125 and the center of the rotary arm axle 123 defines the radius of a circle swept by the rotary arm 122. In various embodiments, $L_2$ may be from 20 cm to 60 cm (e.g., 8-24 inches). In the example sprayer 100 for use with a rotary milking parlor, $L_2$ may be from 30 cm to 45 cm (e.g., 12-18 inches).

The end of the sprayer housing 110 covering the rotary arm 122 may have a length $L_3$ of from 25 cm to 75 cm (e.g., 10-30 inches). Alternatively, $L_3$ may be x*$L_2$, where x is a number of from 1.1 to 1.5 (e.g., 1.2-1.35, or any number or range of numbers therein). As shown in FIG. 8, the rotary arm end of the sprayer housing 110 may have a semi-circular or substantially semi-circular shape, but it may be a different shape (e.g., rectangular, trapezoidal, semi-hexagonal, semi-octagonal, semi-elliptical, etc.). The sprayer wand end of the housing 110 may have a trapezoidal shape, but other shapes are also suitable (e.g., rectangular, oval, etc.), and the housing 110 as a whole may have another shape (e.g., circular, oval, rectangular, hexagonal, octagonal, irregular, combinations thereof).

The distance $L_4$ between the center of the rotary arm axle 123 and the center of the ring 132 is generally fixed (constant) during operation, but can be changed during periods of downtime to change the dimensions of the path swept by the nozzle 142. When the distance $L_4$ is constant, the path swept by the nozzle 142 is circular, oval or elliptical, rather than a combination of shapes. In such embodiments, the distance $L_4$ is within a range determined by the length of the slot 134. When the distance $L_4$ is in the smaller end of the range, the nozzle 142 moves in a relatively large path, and when the distance $L_4$ is in the larger end of the range, the nozzle 142 moves in a relatively small path. In some embodiments, $L_4$ may be from 50 cm to 180 cm (e.g., 20-72 inches). In the example sprayer 100 for use with a rotary milking parlor, $L_4$ may be from 80 cm to 150 cm (e.g., 32-60 inches).

In embodiments in which the distance $L_4$ is variable, the ring 132 may be secured to the sprayer tube or rod 130 and may slide along the slot 134 as the rotary arm 122 rotates and the sprayer tube or rod 130 changes position. In such embodiments, the circular, oval or elliptical path of the nozzle 142 may become more elliptical or oval than that of an otherwise identical sprayer with a fixed distance $L_4$. In embodiments in which the distance $L_4$ is variable, $L_4 > L_2$, and $L_4$ may vary between n+$L_2$ and n-$L_2$, where n is the length of the sprayer tube or rod or rod 130 from the center of the post or axle 125 to the ring 132. In various embodiments, n may be from 60 cm to 120 cm (e.g., 24-48 inches).

In still further embodiments, the distance $L_4$ may be fixed in part and variable in part. In such embodiments, the ring 132 is slidingly secured around the sprayer tube or rod 130, the ring 132 slides within the slot 134 during part(s) of the rotation cycle of the rotary arm 122, and the sprayer tube or rod 130 slides through the ring 132 during remaining part(s) of the rotary arm 122 rotation cycle. For example, when the angle between the rotary arm 122 and the sprayer tube or rod 130 is 0°±y or 180°±y (y being from 0° to 45°, for example, or any angle or range of angles therein), the ring 132 may be in a fixed location at one end of the slot 134, and the distance $L_4$ is fixed. When the angle between the rotary arm 122 and the sprayer tube or rod 130 is from y to 180°-y or from 180°+y to 360°-y, the ring 132 may slide along the slot 134, and the distance $L_4$ may vary. In such embodiments, the nozzle 142 may move in a path that includes multiple elliptical or oval arcs with different focal points (e.g., similar to a dimpled limacon), and the length of the slot 134 is less than 2*$L_2$ (e.g., from 0.5*$L_2$ to 1.5*$L_2$, or any value or range of values therein). Typically, the path has four alternating arcs: a first pair of identical arcs having a first set of focal points (e.g., when the distance $L_4$ is fixed), and a second pair of arcs each having a set of different, but mathematically related (e.g., proportional), focal points (e.g., when the distance $L_4$ is variable). In embodiments in which the distance $L_4$ is fixed in part and variable in part, $L_4$ may be within the same ranges/values as in the embodiments in which the distance $L_4$ is fixed and/or in which the distance $L_4$ is variable.

In some embodiments, the sprayer 100 receives the liquid (e.g., disinfectant solution) from a tank or storage vessel via a pump (not shown). The tank or storage vessel may be placed on the base or pedestal 162 (FIG. 5), or adjacent to the support/footer 160 (FIGS. 4A-D) or the base or pedestal 162, or in a remote location (e.g., under a walkway to the milking parlor 200). The pump may be a conventional single-phase liquid pump, but the invention is not limited thereto. In one embodiment, the pump may output the liquid to a pressure tank equipped with a pressure-sensing switch. The pressure-sensing switch may sense a pressure of the gas-phase material in the pressure tank, and when the pressure is below a predetermined threshold, the pressure-sensing switch may turn on the pump to supply more liquid to the pressure tank. Supplying the liquid from the pressure tank to the sprayer 100 may be controlled or regulated by a solenoid or other, similar valve in the line (e.g., tube or pipe) between the pressure tank and the sprayer 100.

Opening and closing the solenoid or other valve may be controlled by a wired or wireless switch, which may open the solenoid or other valve when the rotary arm 122 is in a certain position (e.g., angular range). For example, and with reference to an angle of 0° at which the rotary arm 122 overlaps and is parallel with the sprayer tube or rod 130, when the rotary arm 122 is in a range of from 120° to 240°, the solenoid or other valve may open, continuously or intermittently. In some embodiments, the solenoid or other valve may open once, continuously, in the range from 120° to 240°, or any range therein (e.g., from 135° to 225°). Alternatively, the solenoid or other valve may open twice, a first time in the range from 120° to 165°, or any range therein (e.g., from 120° to 150°), and a second time in the range from 195° to 240°, or any range therein (e.g., from 210° to 240°). In a further alternative, the solenoid or other valve may open four times, a first time in the range from 120° to 142.5°, or any range therein (e.g., from 120° to 135°), a second time in the range from 142.5° to 165°, or any range therein (e.g., from 150° to 165°), a third time in the range from 195° to 217.5°, or any range therein (e.g., from 195° to 210°), and a fourth time in the range from 217.5° to 240°, or any range therein (e.g., from 225° to 240°).

Alternatively, the solenoid or other valve may open when the milking parlor 200 has rotated a predetermined distance. For example, when the stalls have a width of p cm, the solenoid or other valve may open when the milking parlor 200 has rotated from 0.33*p to 0.67*p cm past each stall cabinet 210-214, or any distance or range of distances therein. For example, the solenoid or other valve may open continuously when the milking parlor 200 has rotated from 0.4*p to 0.6*p cm past each stall cabinet 210-214. Alternatively, the solenoid or other valve may open twice, a first time when the milking parlor 200 has rotated from 0.35*p to 0.45*p cm past each stall cabinet 210-214, and a second time when the milking parlor 200 has rotated from 0.55*p to 0.65*p cm past each stall cabinet 210-214. In a further alternative, the solenoid or other valve may open four times after the milking parlor 200 rotates past each stall cabinet 210-214, a first time from 0.33*p to 0.38*p cm, a second time from 0.42*p to 0.47*p cm, a third time from 0.53*p to 0.58*p cm, and a fourth time from 0.62*p to 0.67*p cm. These ranges are just examples, and variations thereon are also acceptable.

Figure 9:
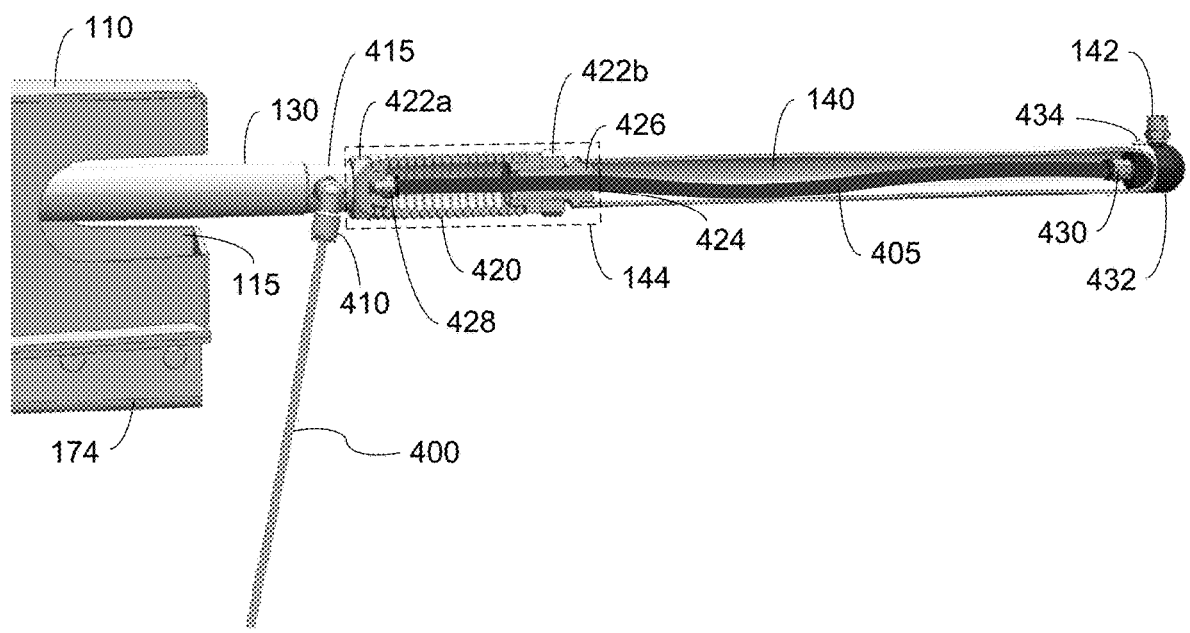
FIG. 9 shows a cutaway view of the exemplary sprayer wand of FIGS. 4A-D with a liquid supply tube to and through the wand, in accordance with one or more embodiments of the present invention.

FIG. 9 shows the fluid path to and through the sprayer wand 130 and sprayer tip 140 to the nozzle 142. A tube 400 from the pump (or, when present, the pressure tank or the valve) connects to a swivel connector 410 in an O-ring or T-joint 415 between the sprayer tube or rod 130 and the connector 144. The tube 400 may be somewhat flexible, and in some embodiments, it may have an elastic modulus of from about 0.5 to about 1.8 (e.g., that of polyethylene, polypropylene, copolymers thereof, etc.). An L-joint or elbow fluidly connects the opening of the swivel connector 410 inside the O-ring or T-joint 415 directly or indirectly to the tube 405 inside the connector 144.

As shown in FIG. 9, the connector 144 comprises a spring 420, abutments 422*a-b* at opposite ends of the spring 420, and a pass-through sleeve 426 through which the tube 405 inside the connector 144 and the sprayer tip 140 passes. However, the connector 144 is not required, and the sprayer tip 140 may be directly connected to the O-ring or T-joint 415 (e.g., by an adhesive, a threaded connection, a tongue-in-groove connection, a combination thereof, etc.). The abutment 422*a* may have a nipple or threaded connector (not shown) to which the sprayer tube or rod 130 is connected, optionally with an adhesive. The end of the abutment 422*a* inside the connector 144 may include a push-to-connect fitting 428, onto or into which the tube 405 is fastened (optionally, with an adhesive). The sleeve 426 may be inserted into the abutment 422*b*, either by pressure (in the case that the sleeve 426 is secured in the abutment 422*b* by a tongue-in-groove or other push-type connection) or by rotation (in the case that the sleeve 426 is secured in the abutment 422*b* by a spiral threaded fitting). Other types of fastening mechanisms (e.g., adhesive in the case that the outer width or diameter of the sleeve 426 is the same as the inner width or diameter of the opening in the abutment 422*b*) are also suitable.

The tube 405 is connected to the nozzle through a second push-to-connect fitting 430. The liquid is supplied to the nozzle 142 through an L-shaped passage in the nozzle connector 432. The nozzle connector 432 has a cylindrical fitting with an outer diameter about equal to the inner diameter of the sprayer tip 140. The nozzle connector 432 may be secured to the sprayer tip 140 using a screw 434 (as shown in FIG. 9), adhesive, a spiral threaded (e.g., screw) connection, a bayonet connection, etc. The nozzle 142 may be similarly secured to the nozzle connector 432.

Exemplary Rotary Milking Parlors

Another aspect of the present invention relates to a rotary milking parlor, comprising a rim 220 (FIGS. 4A-D and 6) having an outer circumference, a plurality of radially-distributed stalls inside the rim 220, and the present sprayer system, adjacent to and outside the rim 220. The present milking parlor rotates and the nozzle of the present sprayer system sweeps under a milk-producing mammal in one of the stalls in the same linear direction (e.g., left-to-right or right-to-left).

The present sprayer system may be designed so that the lengths of the rotary arm 122 and the sprayer wand 130/140 and the position of the ring 132 are selected or defined so that the nozzle has a linear and/or angular velocity substantially matching the linear and/or angular velocity of the parlor rim 220, respectively. In some embodiments of the milking parlor 200, the rotary arm 122 rotates at a rate so that the linear velocity of the nozzle 142 matches or slightly exceeds the linear velocity of the milking parlor 200 at its circumference 220. For example, the linear velocity of the nozzle 142 may be from 1.0 to 1.5 times the linear velocity of the milking parlor 200, or any value or range of values therein (e.g., from 1.01 to 1.20 times).

Conventional milking parlors generally have a plurality of different rotation speeds available thereon. Typically, the milking parlor completes one rotation in the length of time that it takes to complete the milking of the cow (e.g., 4-6 minutes, although more or less time can be allotted for loading the cows in and unloading the cows from the parlor, disinfecting the teats, attaching and removing the milking claw, etc.). For example, when the cows are relatively high milk producers, the rotation cycle for the milking parlor 200 is relatively long, and the rotation rate is relatively low. When the cows are relatively low milk producers, the rotation cycle for the milking parlor 200 is relatively short, and the rotation rate is relatively high. Accordingly, a number of different speeds for rotation of the rotary arm 122 is very useful.

When used to milk cows, the milking parlor 200 may have a diameter of 8-30 m (25-100 ft.) and a number of stalls of from 12 to 100, as described herein although larger parlors are certainly possible and contemplated herein. Each of the stalls in the milking parlor 200 generally has a width (e.g., a distance between adjacent stall cabinets 210 and 212 or 212 and 214) that is the same as the other stalls. For example, the stall width may be from about 80 cm to about 100 cm when the mammal being milked is a cow. In some embodiments, the nozzle 142 crosses the outer circumference 220 of the milking parlor 200 and enters the stall within 20% of the midpoint of the stall along its width (e.g., from 32 to 50 cm away from the stall cabinet 210, 212 or 214). In such embodiments, the nozzle 142 may exit the stall and cross back over the outer circumference 220 of the milking parlor 200 within 20% of the midpoint of the stall along its width, typically on the opposite side from where the nozzle 142 entered the stall (e.g., from 32 to 50 cm away from the other stall cabinet 212 or 214).

The milking parlor 200 may be accompanied by a ramp or an elevated walkway (not shown) for the mammals to enter and exit the stalls. The ramp or walkway may be divided into an entrance or loading alley on one side and a return or exiting alley on an opposite side. There may be a barrier between the two alleys. At the interface between the ramp or walkway and the milking parlor 200, each alley may have a width the same as or slightly greater than (e.g., from 1.0 to 1.5 times) the width of a stall.

Exemplary Methods

The present invention further relates to methods of making and using the present sprayer system. For example, a method of disinfecting the teats of a milk-producing mammal may comprise placing or guiding the mammal to a stall in a rotary milking parlor, partially rotating the rotary milking parlor (e.g., by an arc or angle equal or proportional to the arc or angle of the stall), operating the present sprayer system such that the nozzle 142 sweeps under the teats of the mammal in the stall in the same direction that the rotary milking parlor is moving, and spraying a disinfectant through the nozzle 142 when the nozzle sweeps under the teats of the mammal. Typically, the disinfectant is sprayed (e.g., onto the mammal's teats) prior to placing or attaching a milking claw onto the mammal's teats, to ensure that the mammal's teats are disinfected before the mammal is milked, and to minimize the probability of a contaminant getting into the milk obtained from the mammals.

In further embodiments, the method may further comprise measuring a distance or an angle that the rotary milking parlor has rotated, and synchronizing rotation of the rotary arm with the rotation of the milking parlor. For example, the encoder 300 may mark (or use as a "zero" distance or angle reference point) a position on the outer circumference 220 of the milking parlor 200 under the center of a stall cabinet 210, 212 or 214 when the rotary arm 122 and the sprayer tube or rod 130 are at an angle of 0° (see FIG. 4A) and the sprayer wand is fully withdrawn or retracted from the milking parlor. In such a position, the axis along the center of the sprayer tip 140 may be aligned (or substantially aligned) with the center of the stall cabinet 210, 212 or 214. As the milking parlor 200 rotates, the encoder 300 measures the distance that the outer circumference 220 travels. A controller (e.g., microcontroller, microprocessor, or digital signal processor) on the control panel 150 receives the distance information from the encoder 300, and instructs the motor in the sprayer 100 to rotate the rotary arm 122 by an angle or arc corresponding to the distance. Typically, when the milking parlor 200 rotates by a distance corresponding to one stall width (i.e., the distance from the center of one stall cabinet to the center of the next adjacent stall cabinet), the rotary arm 122 rotates by 360°, or one cycle. However, the manner in which the rotary arm 122 rotates during the cycle may vary.

For example, in some embodiments, the rotary arm 122 may rotate continuously at a fixed rate during the cycle. In such embodiments, when the encoder 300 measures that the outer circumference 220 of the parlor 200 has traveled a distance of about 25% of a stall width, the rotary arm 122 may rotate about 25% of a 360° cycle, or about 90° (e.g., FIG. 4B). Similarly, when the encoder 300 measures that the outer circumference 220 of the parlor 200 has traveled about 50% of the stall width, the rotary arm 122 may rotate by about 50% of the 360° cycle, or about 180° (e.g., FIG. 4C), in which case the sprayer tip 140 is fully extended into the stall, and when the encoder 300 measures that the outer circumference 220 of the parlor 200 has traveled about 75% of the stall width, the rotary arm 122 may rotate by about 270° (e.g., FIG. 4D). Thus, the rotary arm 122 may rotate at a rate of m*R, where R is the rotation rate of the milking parlor 200 (e.g., 6-10 times/hour), and m is the number of stalls in the milking parlor 200.

In other embodiments, the rotary arm 122 may rotate continuously at a variable rate during the cycle. For example, in such embodiments, the rotary arm 122 may rotate at a relatively low rate when the outer circumference 220 of the parlor 200 is within a first distance (e.g., ±25%) of the center of a stall cabinet (or any percentage, range of percentages, distance or range of distances therein), as measured by the encoder 300. However, when the encoder 300 measures that the outer circumference 220 of the parlor 200 has traveled more than the first distance in a given cycle, the rotary arm 122 may rotate by a higher rate, until the outer circumference 220 is within the first distance of the center of the next stall cabinet. For example, when the angle between the rotary arm 122 and the sprayer tube or rod 130 is 0-90° or 270-360°, the rotary arm may rotate at an angular rate that is 0.5-0.95 times m*R, and when the angle between the rotary arm 122 and the sprayer tube or rod 130 is 90-270°, the rotary arm 122 may rotate at an angular rate that is (1/0.5-0.95) times m*R, such that the average rotation rate of the rotary arm 122 during each cycle is m*R. In another example, when the angle between the rotary arm 122 and the sprayer tube or rod 130 is 0-45° or 315-360°, the rotary arm may rotate at a first angular rate (e.g., 0.5-0.75 times m*R), when the angle between the rotary arm 122 and the sprayer tube or rod 130 is 45-90 or 270-315°, the rotary arm may rotate at a second, faster angular rate (e.g., 0.75-1.25 times m*R), and when the angle between the rotary arm 122 and the sprayer tube or rod 130 is 90-270°, the rotary arm may rotate at a third, even faster angular rate (e.g., 1.25-2.0 times m*R), such that the average rotation rate of the rotary arm 122 during each cycle is m*R. In even further embodiments, the rotation rate of the rotary arm 122 may increase linearly or nonlinearly between 0° and 180°, and decrease linearly or nonlinearly between 180° and 360°, such that the average rotation rate of the rotary arm 122 during each cycle is m*R.

In even further embodiments, the rotary arm 122 may rotate intermittently during the cycle. In such embodiments, when the rotary arm 122 rotates, it may be at a fixed rate or a variable rate. In such embodiments, the rotary arm 122 may not rotate at all when the outer circumference 220 of the parlor 200 is within 25% (or any percentage or range of percentages therein) of the center of a stall cabinet as measured by the encoder 300. However, when the encoder 300 measures that the outer circumference 220 of the parlor 200 has traveled outside of this "stationary zone" of the rotary arm 122, the rotary arm 122 may rotate at a rate greater than m*R, such that the average rotation rate of the rotary arm 122 during each cycle is m*R, as explained herein.

In various embodiments, the method of spraying sprays the liquid intermittently or periodically during the rotations of the sprayer arm 122. For example, when the angle between the rotary arm 122 and the sprayer tube or rod 130 is between 120° and 240° (or any range of angles therein, such as from 135° to 225° or from 150° to 210°), the controller on the control panel 150 may open the valve and/or enable the pump to supply the liquid to the sprayer 100 through the tube 400. It is within the level of skill in the art to program the controller to correlate such angles in the cycle of the rotary arm (which correspond to specific distances measured by the encoder 300) to operations to open or close the valve, a switch controlling the valve or pump, etc. Thus, the method may further comprise supplying or flowing the liquid to the nozzle 142 and/or spraying the object (e.g., the mammal's teats) when the rotary arm is greater than or equal to a first angle and less than or equal to a second angle in its rotation cycle, and stopping the supply or flow of the liquid to the nozzle 142 when the rotary arm is less than or equal to the first angle and greater than or equal to the second angle in its rotation cycle, where the second angle is greater than the first angle. In some embodiments, the first and second angles are θ and 360°−θ, respectively, and θ may be from 90° to 150°.

When the nozzle 142 travels at a linear velocity (or an angular rate) greater than that of the outer circumference 220 of the milking parlor 200, it ensures complete coverage of the object being sprayed (e.g., the teats of the mammal and the nearby skin that may come into contact with the milking claw or other milking device). When the mammal's teats are distributed over an area having appreciable or relatively similar length and width dimensions (e.g., where adjacent teats in a first direction are separated by a first distance that is within 50% of a second distance by which adjacent teats in a second, substantially orthogonal direction are separated), the relatively oval (or more concave) path of the nozzle 142 covers a greater area in comparison to the relatively shallow path swept by the end of the sprayer 46 in FIGS. 1-3.

Another method encompassed by the present invention is a method of making the sprayer system, comprising operably connecting the motor, the housing 110, and the controller or control panel 150 to the support, operably connecting the rotary arm 122 to the motor and/or the first axle 123, operably connecting the bearing 124 and the wand to the rotary arm 122, passing the wand through the ring 132, securing the ring 132 directly or indirectly to the housing 110, and electrically connecting the controller or control panel 150 to the motor. The rotary arm 122 and the ring 132 are configured so that rotation of the rotary arm 122 causes the nozzle 142 to move in a circular, elliptical or oval pattern, typically in a direction opposite from the rotation of the rotary arm 122. In various embodiments, the sprayer system is configured to spray disinfectant onto the teats of a mammal in a rotary milking parlor 200.

In various embodiments of the method of making the sprayer system, the sprayer system may be configured in one or more arrangements and/or to perform one or more functions as described herein. Thus, for example, the rotary arm 122 may be configured to rotate 360° around the first axle 123. In other or further examples, the ring 132 may be slidingly or fixedly secured directly or indirectly to the housing 110. In such examples, the method may further comprise forming a slot 134 in or attaching the slot 134 directly or indirectly to the housing such that the ring 132 slides in or along the slot 134.

In other or further embodiments, the method further comprises forming the support by connecting a support post 170 to a support base 162/164, connecting a housing base 172 to the housing 110 and to the support post 170, and connecting a support arm 174 to the housing 110 and either the housing base 172 or the support post 170. Alternatively or additionally, the bearing 124 may be fixed or secured to or placed on a first post or a second axle 125. In such embodiments, the bearing 124 may be integrated with a connector, which may be in turn connected to an end of the wand. Typically, like the nozzle 142, the bearing 124 also rotates in the direction opposite from the rotation of the rotary arm 122.

Yet further embodiments of the method may further comprise forming the wand by electrically connecting an encoder 300 to the controller or control panel 150. The encoder 300 is configured to determine a position of a rotary structure such as the milking parlor 200 on which an object or subject is placed, where the object or subject is to be sprayed by the sprayer 100, as is described herein.

Exemplary Computer-Readable Media

A further aspect of the present disclosure relates to algorithms, computer program(s), and/or software (e.g., computer-readable media) implementable and/or executable in a general-purpose computer or workstation equipped with a conventional digital signal processor or microprocessor, adapted to implement or perform the method of disinfecting the teats of milk-producing mammals in a rotary milking parlor. For example, the computer program or computer-readable medium generally contains a set of instructions which, when executed by an appropriate processing device (e.g., a signal processing device, such as a microcontroller, microprocessor or DSP device), is configured to perform the method of disinfecting the teats of milk-producing mammals described herein.

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Thus, an aspect of the present invention relates to a non-transitory computer-readable medium, comprising a set of instructions encoded thereon and adapted to practice the method of disinfecting the teats of milk-producing mammals in a rotary milking parlor, including any of the details discussed herein. In essence, the set of instructions encoded on the computer-readable medium may implement substantially any function of any hardware described herein, and may perform any part of any method described herein that is performed by the sprayer system and/or milking parlor.

Figure 10:
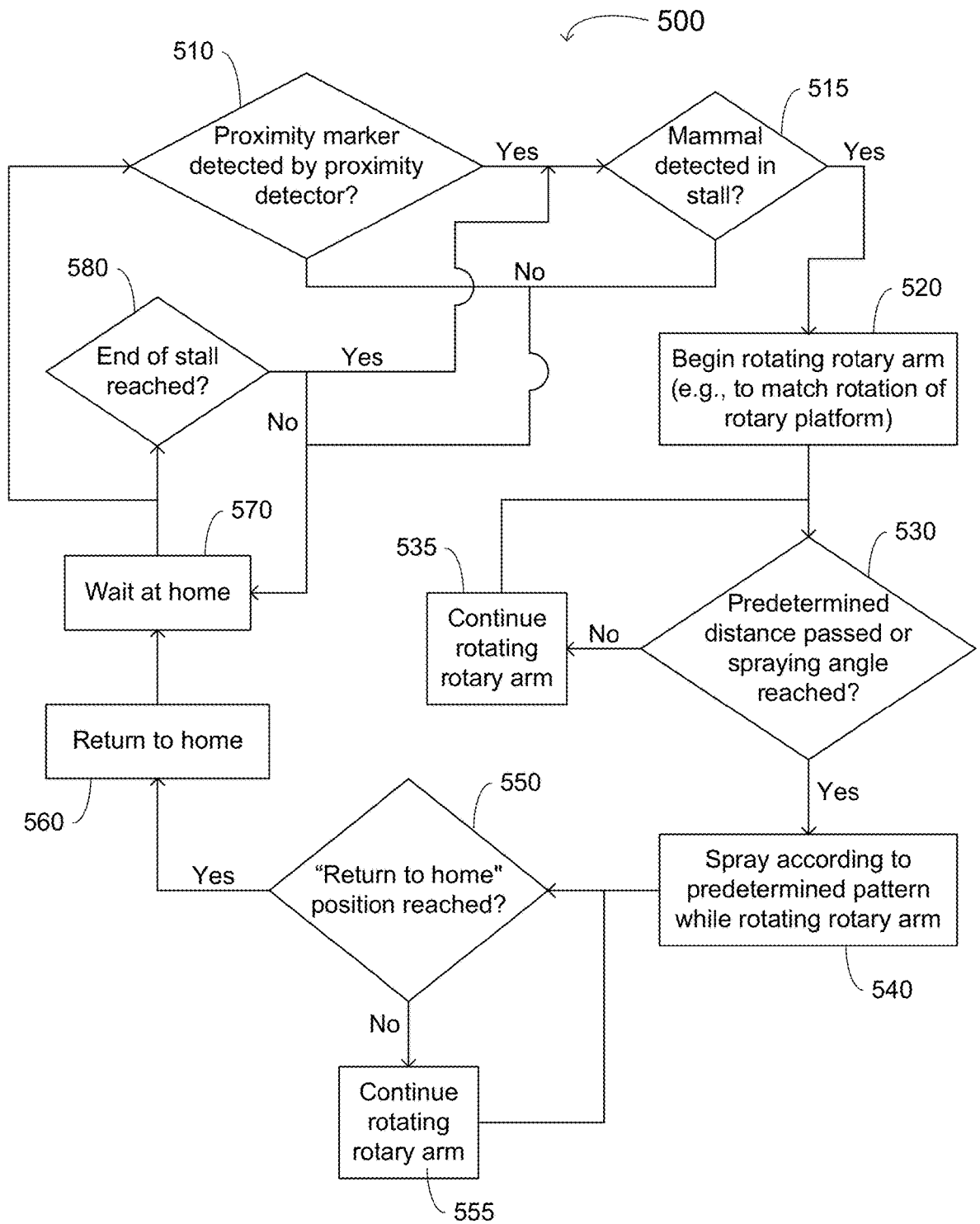
FIG. 10 is a flow chart showing an exemplary method of disinfecting the teats of milk-producing mammals (such as cows) in a rotary milking parlor, in accordance with one or more embodiments of the present invention.

In particular, the non-transitory computer-readable medium, comprising a set of instructions encoded thereon and adapted to practice the exemplary method shown in the flow chart 500 in FIG. 10. For example, the exemplary method may begin at 510 by determining whether a proximity marker or beacon has been detected by a proximity sensor, such as the proximity sensor 315 shown in FIGS. 6-7. In general, the proximity marker or beacon designates or indicates the leading edge of a milking stall in the rotary parlor, or the transition between adjacent milking stalls in the rotary parlor. However, the proximity marker or beacon may also designate or indicate a known position on the rotary milking parlor from which stall edges or borders can be measured (e.g., using the encoder 300 in FIGS. 6-7). Generally, when the proximity marker or beacon is not detected, the rotary arm waits at 560 in the "home" position (e.g., 0° or 12 o'clock with respect to the sprayer wand, as shown in FIG. 4A) until the proximity marker or beacon is detected.

In some embodiments, when the proximity marker or beacon is detected, the method 500 determines whether there is a mammal (e.g., a cow) in the stall into which the sprayer nozzle is to enter. In one example, the mammal is detected optically (i.e., using an optical sensor), but the mammal may be detected in other ways (e.g., acoustically using a form of radar, when a mass exceeding a threshold mass is detected in the stall using a scale, etc.). When a mammal is not detected in the stall at 515, the rotary arm remains at the "home" position at 570 until either (i) the opposite edge (or end) of the stall is reached at 580 or (ii) another proximity marker or beacon is detected at 510. When the mammal is detected in the stall at 515, the rotary arm begins to rotate at 520. In some embodiments, the direction and speed of rotation of the rotary arm matches that of the milking parlor. Alternatively, the method 500 (e.g., implemented by the exemplary software) can proceed directly to rotating the rotary arm at 520 when the proximity marker or beacon is detected at 510.

As the milking parlor rotates, the method 500 determines at 530 whether either (i) the milking parlor has rotated a predetermined distance or angle, or (ii) the rotary arm has reached a predetermined spraying angle (e.g., an angle at which the disinfectant pump or a valve in the disinfectant line provides positive disinfectant pressure to the sprayer nozzle, such as nozzle 142 in FIGS. 4A-D and 5). If the predetermined distance or angle has not been reached, the rotary arm continues to rotate at 535. When the predetermined distance or angle is reached, the sprayer system 100 sprays disinfectant onto the underside of the mammal in the stall at 540 according to a predetermined pattern (e.g., during predetermined angular ranges in the rotation cycle of the rotary arm, as discussed herein), while the rotary arm continues to rotate.

In some embodiments, the method 500 (e.g., implemented by the present software) determines at 540 whether the rotary arm reaches a "return to home" position. For example, the "return to home" position of the rotary arm may be about 90° with respect to the sprayer wand (e.g., about 3 o'clock or 270° in the rotation of the rotary arm 122; see FIG. 4D). If the "return to home" position has not yet been reached, the rotary arm continues rotating and spraying in the pattern (to the extent defined by the signal controlling the solenoid or other valve) at 555. When the "return to home" position is reached, the rotary arm returns to the "home" position at 560. In one embodiment, the rotary arm returns to the "home" position at a rate greater than (e.g., significantly greater than) the rotation rate at any previous point in its rotation.

The rotary arm then waits at the home position at 570 until either the milking parlor rotates a full stall width at 580 or another proximity marker is detected at 510. Accordingly, in general, the system does not or cannot include two proximity markers or beacons within the width of a single stall. When the milking parlor rotates a full stall width (i.e., reaches the "end of the stall," or the next stall edge or border relative to the leading edge of the stall in 510 discussed above), the method 500 may return to detecting a mammal in the next stall at 515 or, if mammal detection is not required, beginning the next cycle of rotation of the rotary arm at 520.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:
1. A sprayer system, comprising:
a) a wand having a nozzle at a first end thereof;
b) a rotary arm configured to rotate around a first axle, wherein the rotary arm has a first end connected to a second end of the wand through a rotating or rotatable connection mechanism, and the second end of the wand is opposite from the first end of the wand;
c) a motor configured to drive rotation of the rotary arm;
d) a support, configured to mechanically support the motor and/or the rotary arm; and
e) a controller or control panel configured to control the rotation of the rotary arm;
wherein:
the wand and the rotary arm are configured so that the rotation of the rotary arm causes the nozzle to move in a circular, elliptical and/or oval pattern;
the wand comprises a hollow tube, and the system further comprises a tank configured to store a liquid, a hose configured to supply the liquid from the tank to the wand, and a valve along the hose configured to open and close in response to a valve control signal from the controller or control panel; and
the valve control signal keeps the valve closed when the rotary arm and the wand are at an angle between 0° and 90° and between 270° and 360°, and the valve control signal can open the valve only when the angle between the rotary arm and the wand is from 90° to 270°, wherein 0° is a position in which the rotary arm and the wand overlap and/or the nozzle is retracted from the parlor to its maximum extent.

2. The sprayer system of claim 1, wherein the connection mechanism comprises:
a bearing on a first post or a second axle, and
a connector connecting the bearing to the second end of the wand.

3. The sprayer system of claim 1, wherein the nozzle rotates in the circular, elliptical and/or oval pattern in a direction opposite from the rotation of the rotary arm.

4. The sprayer system of claim 1, wherein the liquid comprises a disinfectant.

5. The sprayer system of claim 1, further comprising an encoder configured to determine a position of a rotary structure on which an object or subject to be sprayed by the sprayer system is placed.

6. The sprayer system of claim 5, wherein the encoder comprises a wheel on a third axle or shaft, configured to (i) contact a smooth, at least substantially circular surface of the rotary structure and (ii) measure a distance that the smooth, at least substantially circular surface moves.

7. The sprayer system of claim 6, wherein the encoder further comprises:
a code disc to which the third axle or shaft is operably connected, configured to rotate as the wheel turns; and
a cable configured to carry a signal containing information relating to rotation of the code disc, the signal being received directly or indirectly by the controller or control panel.

8. The sprayer system of claim 6, further comprising:
one or more markers or beacons, each in a predetermined position on or adjacent to the rotary structure; and
a proximity detector that recognizes each of the one or more markers or beacons and transmits a signal directly or indirectly to the controller or control panel that designates or indicates a known position on the rotary structure from which the distance can be measured.

9. The sprayer system of claim 1, further comprising an object sensor configured to identify a presence or absence of the object or subject on the rotary structure to be sprayed.

10. The sprayer system of claim 1, further comprising a housing covering or enclosing a part of the wand, the rotary arm, and a rotatable ring through which the wand passes.

11. The sprayer system of claim 10, wherein the ring is adjustably fixed or secured directly or indirectly to the housing or the support.

12. The sprayer system of claim 10, further comprising a slot in the housing or support along which the ring is secured or fixed, the slot having an axis that is parallel with the rotary arm and the wand when the rotary arm and the wand are parallel with each other.

13. The sprayer system of claim 10, wherein the support is further configured to mechanically support the housing.

14. The sprayer system of claim 1, further comprising a housing covering or enclosing a part of the wand, the rotary arm, and a rotatable ring through which the wand passes, wherein the support is further configured to mechanically support the housing, and the wand and the rotary arm are further configured with the ring so that the rotation of the rotary arm causes the nozzle to move in the circular, elliptical and/or oval pattern.

15. The sprayer system of claim 14, wherein the rotary arm rotates 360° around the first axle, the rotating or rotatable connection mechanism rotates 360°, and the ring is adjustably fixed or secured directly or indirectly to the housing or the support.

16. The sprayer system of claim 1, wherein the rotary arm rotates 360° around the first axle, and the connection mechanism rotates 360°.

17. The sprayer system of claim 16, further comprising a rotatable ring secured directly or indirectly to the support, through which the wand passes.

18. A rotary milking parlor, comprising:
a) an outer circumference;
b) a plurality of radially-distributed stalls within the outer circumference; and
c) the sprayer system of claim 1, adjacent to and outside the outer circumference;
wherein the rotation of the rotary arm is synchronized to and/or controlled by rotation of the milking parlor.

19. The milking parlor of claim 18, wherein each of the stalls has a width, and the nozzle crosses the outer circumference and enters the stall within 25% of the midpoint of the stall along its width.

20. The milking parlor of claim 18, wherein the controller or control panel is configured to rotate the rotary arm:
in a same direction of the rotation of the milking parlor; and
at a rate that is dependent on and proportional to a rate of the rotation of the milking parlor.

* * * * *